(12) United States Patent
Wilson, Jr.

(10) Patent No.: US 8,313,403 B2
(45) Date of Patent: Nov. 20, 2012

(54) HOLLOW SHAFT EPICYCLIC TRANSLATIVE DRIVE WITH CENTRALLY POSITIONED TRANSMITTANCE AND INTEGRATED UTILITY APPARATUS

(76) Inventor: David Wilson, Jr., Fort Collins, CO (US)

(*) Notice: Subject to any disclaimer, the term of this patent is extended or adjusted under 35 U.S.C. 154(b) by 763 days.

(21) Appl. No.: 12/386,911

(22) Filed: Apr. 24, 2009

(65) Prior Publication Data

US 2010/0273597 A1 Oct. 28, 2010

(51) Int. Cl.
*F16H 48/06* (2006.01)
(52) U.S. Cl. ............... 475/149; 475/336; 475/343
(58) Field of Classification Search ........... 475/149, 475/150, 207, 302, 336, 343
See application file for complete search history.

(56) References Cited

U.S. PATENT DOCUMENTS

| | | | |
|---|---|---|---|
| 3,203,275 A | 8/1965 | Hoover | |
| 4,060,137 A | 11/1977 | Bickford et al. | |
| 4,641,887 A | 2/1987 | Klueting | |
| 5,125,284 A | 6/1992 | Carriere | |
| 5,636,145 A * | 6/1997 | Gorman et al. | 702/148 |
| 5,704,608 A * | 1/1998 | Petocchi | 271/116 |
| 7,302,873 B2 | 12/2007 | Nett | |
| 2009/0088283 A1* | 4/2009 | Schimke | 475/204 |
| 2009/0318258 A1* | 12/2009 | Yang | 475/343 |

* cited by examiner

*Primary Examiner* — David D Le
*Assistant Examiner* — Stacey Fluhart
(74) *Attorney, Agent, or Firm* — Harold A. Burdick

(57) ABSTRACT

A drive is disclosed that is useful with a variety of apparatus for either multiplying torque or increasing rotational speed. The drive includes a supported inner shaft having a sun gear at one end, the inner shaft receivable through a hollow outer coaxial shaft having an engageable transmittance (a spur gear, for example) intermediate first and second opposite ends thereof. A planetary gear set platform is located at one end of the outer shaft, planet gears rotatably mounted thereabout in engagement with the sun gear received through the platform for rotation in a stationary ring gear. A right angle translate gear is affixed to the inner shaft adjacent an end thereof opposite the sun gear, a rotational source engagable at one of the translate gear and the transmittance and a utility output engagable at the other.

20 Claims, 47 Drawing Sheets

US 8,313,403 B2

HOLLOW SHAFT EPICYCLIC TRANSLATIVE DRIVE WITH CENTRALLY POSITIONED TRANSMITTANCE AND INTEGRATED UTILITY APPARATUS

FIELD OF THE INVENTION

This invention relates to drive trains having torque or rotational speed modulating characteristics and, more particularly, relates to epicyclic drives having such characteristics.

BACKGROUND OF THE INVENTION

Various torque amplifying (or multiplying) drive trains are in wide usage in a variety of applications (see, for example, U.S. Pat. Nos. 7,311,025, 4,641,887 and 3,203,275). Many shaft rotation speed increasing drive trains are also known and have much in common with the known torque increasing drives. Either type of drive essentially translates speed and torque in a known relationship utilizing various techniques, usually employing various gear based transfers.

In particular, planetary torque multipliers are well known, such systems typically multiplying torque in linearly associated stages. These systems use a sun gear to drive a set of planet gears mounted on a so-called "spider" platform and within a ring gear. The spider platform of one stage provides the input to the sun gear of the next stage in line, each stage multiplying torque. Very large torque values can be developed in this manner. However, as the torque carried through the system increases, each stage requires system gears that are stronger and wider than the last. These requirements add to overall system length, weight and cost, and are often noisy and rough running.

Often space constraints limit the stages allowed in such systems and thus the torque increase available. To ameliorate the space problem, large (and frequently expensive) input drive motors are often required. Alternatively, right angle drives are often utilized where required, and many such mechanisms for translating rotational direction are known (see, for example, U.S. Pat. Nos. 7,513,179, 7,302,873, and 5,125,284). Right angle drive translation saves space, but right angle gears interfaces are often inherently weaker. The transfer of highly amplified radial loads to an output through such interfaces (bevel gear sets, for example) is problematical, resulting in high friction losses and subjecting the gears in the interface to tooth breaking and stripping. Moreover, the very nature of such implementations wherein the input direction and the output direction are at an angle to one another unbalances the mechanism making it inappropriate for some uses as currently conceived. Further improvement in such drive systems could thus still be utilized.

SUMMARY OF THE INVENTION

This invention provides a hollow shaft epicyclic drive with centrally positioned transmittance (input or output), and apparatus into which the drive is integrated. The drive is translative in either or both drive direction (preferably right angle) and torque and rotational speed. The drive provides efficient torque amplification or rotational speed increase, is compact, balanced, low weight and low cost, and eliminates the need for expensive components (utilizing, in many cases, off-the-shelf motors and/or preliminary stage planetary torque increasers or the like).

In operation, the drive is relatively quiet and smooth running. In use for torque multiplication, the drive of this invention allows modest torque values to be maintained until the direction of power transmission has been translated (in this case, turned at right angle with, if desired, torque increase. After the direction of power transmission has changed, power transmission is further translated (increased in this case) utilizing the drive of this invention but without unbalancing the overall installation with unduly lengthy torque multiplication stages. Thus, one aspect of what is provided herein is a unique means of developing high torque values in a compact divided power transmission layout.

This invention includes epicyclic shafts in an assembly providing a translative drive (speed/torque and/or rotational direction). The drive includes an inner shaft having an engageable end and a sun gear at an opposite end. The inner shaft is received in a coaxial hollow outer shaft having an engageable transmittance intermediate first and second opposite ends thereof. A planetary gear set platform is located at the second end with planet gears rotatably mounted thereabout. The inner shaft extends through the hollow outer shaft and is rotatable therein with the sun gear extending through the platform into engagement with the planet gears. The engageable end of the inner shaft extends from the first end of the outer shaft.

A stationary ring gear engages the planet gears therein and thus facilitates rotation of the outer shaft responsive to rotation of the planet gears by the sun gear of the inner shaft. A right angle translate gear is preferably affixed at the engageable end of the inner shaft. The integrated utility apparatus of this invention includes an epicyclic translative drive in combination with a rotational source engaged at either the right angle translate gear or the transmittance and a utility output engageable at the other of the translate gear and the transmittance.

It is therefore an object of this invention to provide an epicyclic translative drive.

It is another object of this invention to provide utility apparatus employing an epicyclic translative drive.

It is still another object of this invention to provide an epicyclic drive that provides efficient torque amplification or rotational speed increase.

It is yet another object of this invention to provide an epicyclic translative drive that is compact, balanced, low weight and low cost.

It is still another object of this invention to provide an epicyclic translative drive that reduces requirement for use of specially manufactured components, planetary torque increasers and/or motors.

It is yet another object of this invention to provide an epicyclic translative drive that provides relatively quiet and smooth running operation.

It is another object of this invention to provide an epicyclic drive including an inner shaft having an engageable end and a sun gear at an opposite end, a coaxial hollow outer shaft having an engageable transmittance intermediate first and second opposite ends thereof, a planetary gear set platform at the second end thereof with planet gears rotatably mounted thereabout, the inner shaft rotatably extending through the hollow outer shaft with the sun gear extending through the platform into engagement with the planet gears and the engageable end extending from the first end, and a stationary ring gear engaging the planet gears therein to facilitate rotation of the outer shaft responsive to rotation of the planet gears by the sun gear of the inner shaft.

It is still another object of this invention to provide an epicyclic translative drive that includes an inner shaft having a right angle translate gear affixed at an engageable end thereof and a sun gear at an opposite end, and a coaxial hollow outer shaft having an engageable transmittance intermediate first and second opposite ends thereof, a planetary platform at the second end thereof, the inner shaft rotatably extending through the hollow outer shaft with the sun gear extending through the platform and the engageable end extending from the first end.

It is yet another object of this invention to provide a utility apparatus which includes and epicyclic translative drive having an inner shaft having a sun gear at one end, a coaxial hollow outer shaft having an engageable transmittance intermediate first and second opposite ends thereof, a planetary gear set platform at the second end thereof with planet gears rotatably mounted thereabout, the inner shaft rotatably extending through the hollow outer shaft with the sun gear extending through the platform into engagement with the planet gears, and a right angle translate gear affixed to the inner shaft opposite the sun gear, a rotational source engaged at one of the right angle translate gear and the transmittance, and a utility output engageable at the other of the translate gear and the transmittance.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
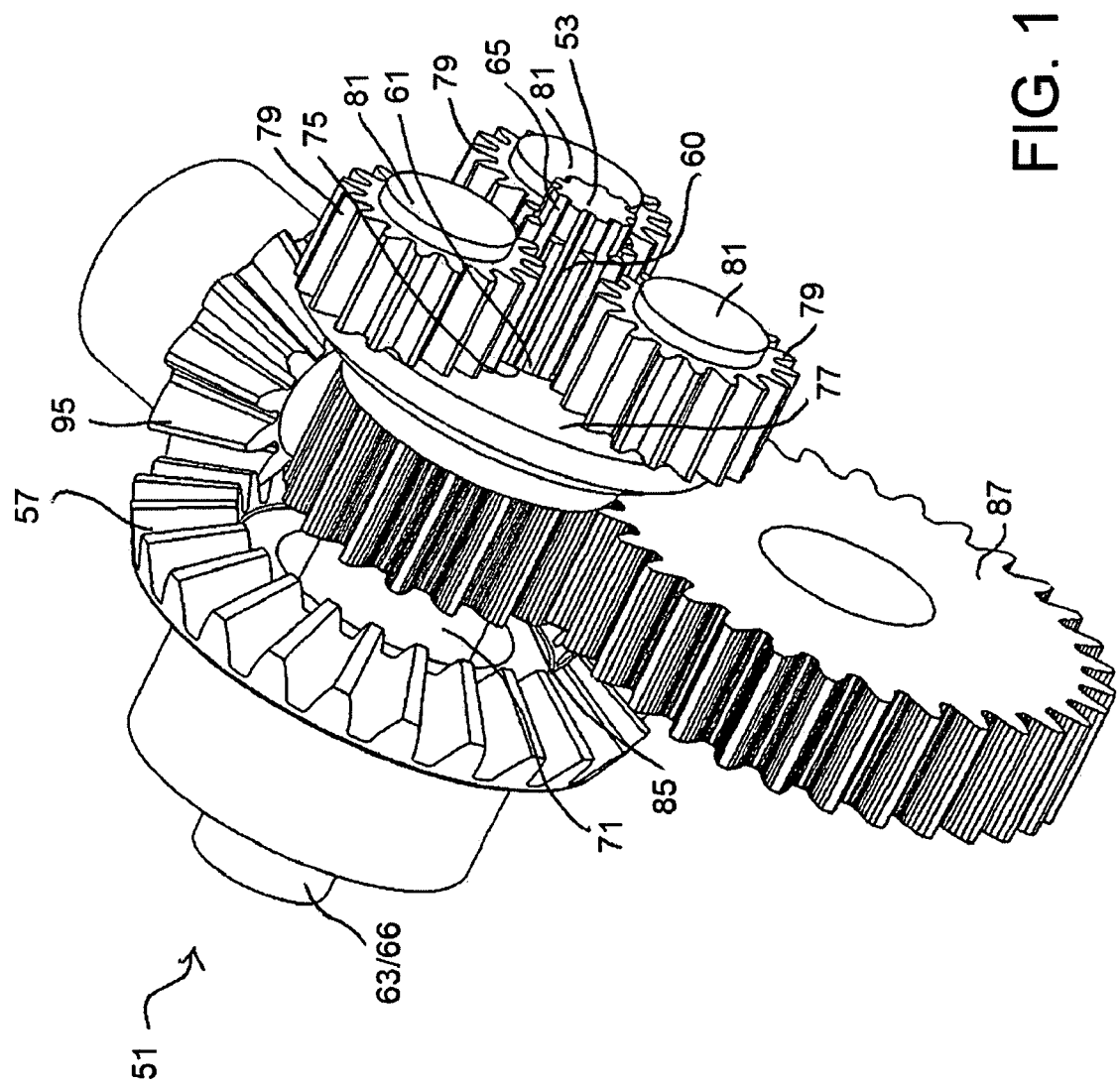
FIG. 1 is a perspective view of the hollow shaft epicyclic translative drive having centrally positioned input/output transmittance of this invention.

The hollow shaft epicyclic translative drive 51 of this invention is illustrated in many of the FIGURES, both alone as in FIG. 1 and in combination as illustrated thereafter. Drive 51 as shown in FIGS. 1 through 4 includes inner shaft 53 having an engagable end 55 with means for drive rotational input or utility output (in this case a right angle translate bevel or hypoid gear) 57 affixed thereat, for example, using key 58 in keyway 59 as shown in FIG. 4. Sun gear 60 is affixed to or machined at opposite shaft end 61. Shaft support segments 63 and 65 are located at the ends of shaft 53 (either on the shaft itself or other structure such as at the boss end 66 of bevel gear 57) for rotating receipt at appropriate supporting surfaces (for example, bearings 67 and 69, respectively, or the like pressed into housing structures of utility apparatus incorporating the drive).

Figure 14:
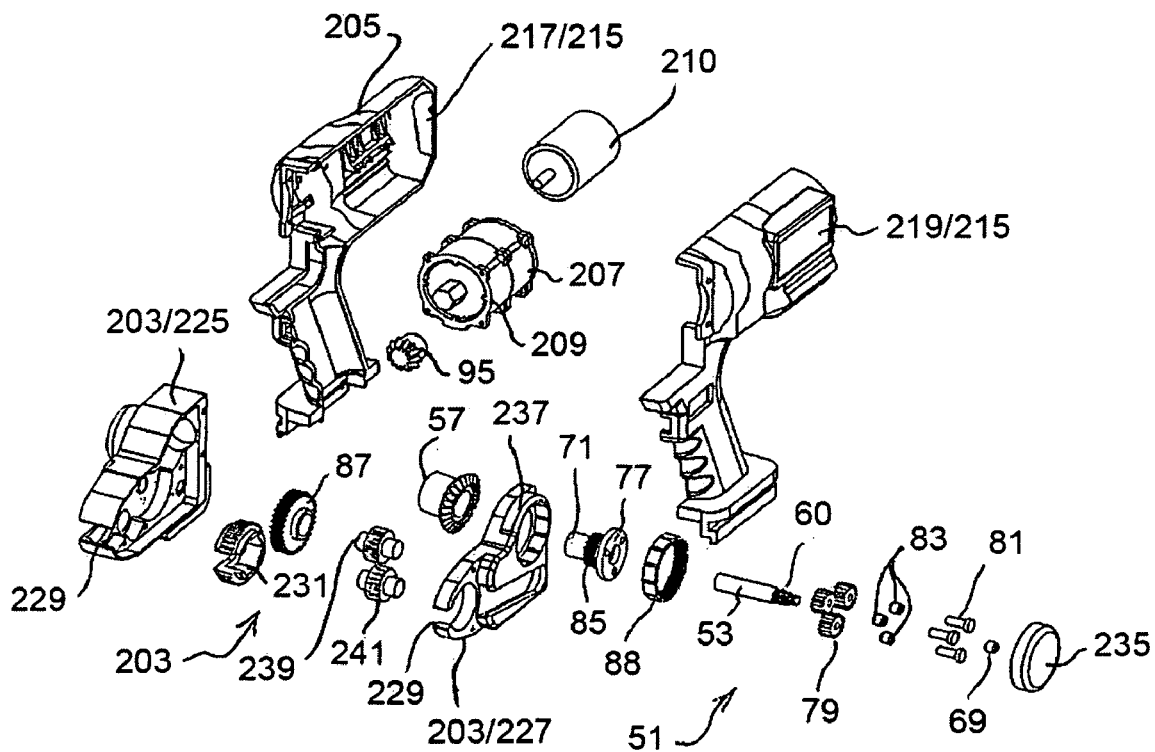
FIG. 14 is another partially exploded view of the apparatus of FIG. 12.
Figure 15:
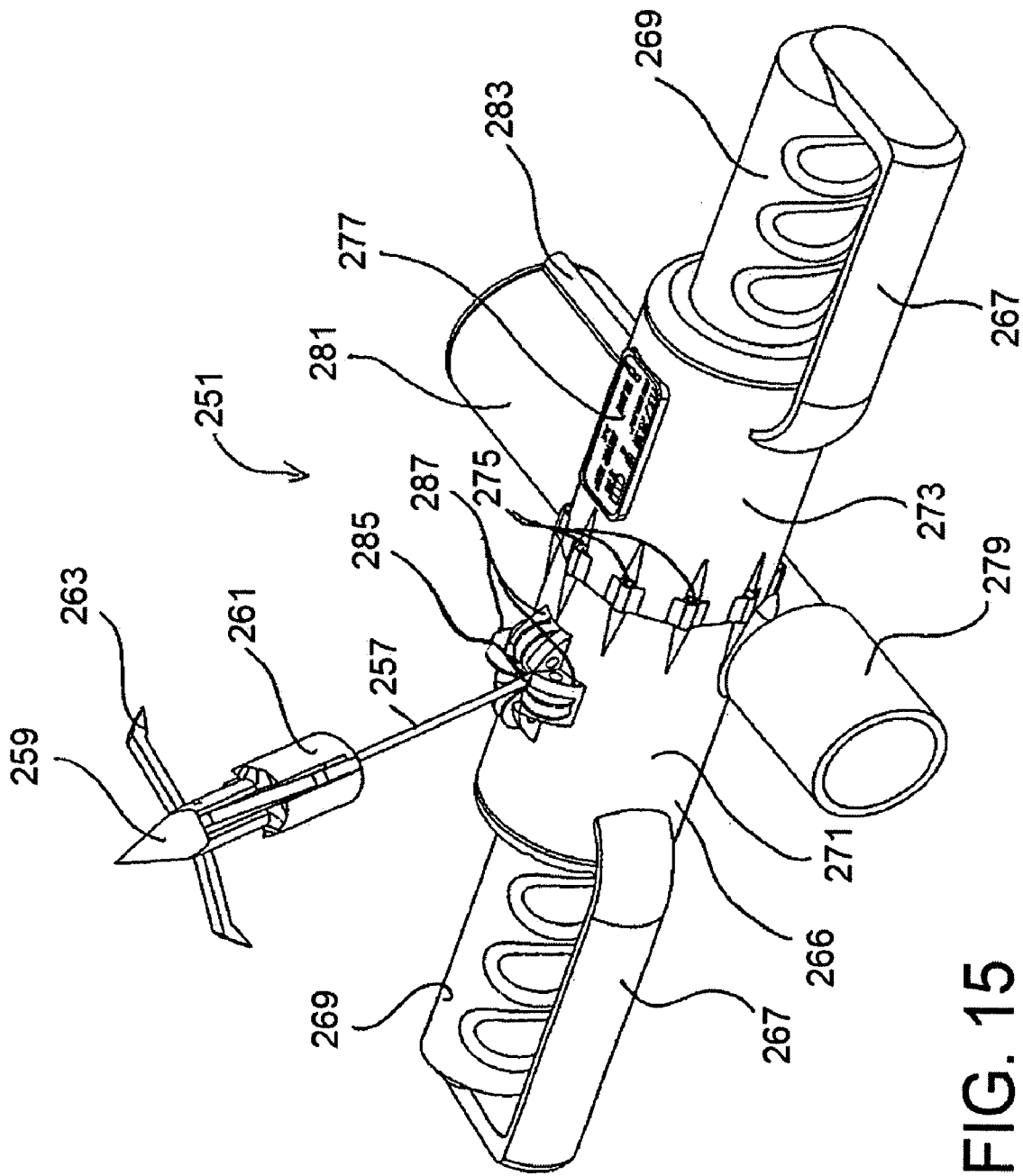
FIG. 15 is a perspective view of a third embodiment of apparatus of this invention (a one-man winch) utilizing the drive in accord with FIG. 1.

Inner shaft 53 is rotatably received through coaxial hollow (tubular) outer shaft 71, ends 55 and 61 of inner shaft 53 extending from first and second opposite ends 73 and 75, respectively, of outer shaft 71. Sun gear 60 extends through planetary gear set platform 77 formed or affixed at outer shaft end 75 thereat to engage planet gears 79 rotatably mounted at platform 77 (for example, three equally spaced gears in the set, though a greater or fewer number could be utilized for enhanced torque multiplication). Gears 79 are rotatably mounted on axles 81 (preferably capped axles) pressed into openings at the face of platform 77 (with bearings 83, while not shown in FIGS. 1 through 4, preferably utilized between the shafts and the gears as illustrated in FIG. 14). A transmittance 85 (providing means for rotational input or utility output engagement of the drive at outer shaft 71) is located at an external (outer) surface of outer shaft 71 intermediated opposite ends 73 and 75 thereof. Transmittance 85 is preferably an integrally formed structure at shaft 71, such as the spur drive gear illustrated in FIGS. 1 through 4. Transmittance 85 is couplable with primary input/output (in this case a spur gear) 87.

A housing mounted stationary ring gear 88 guides/accommodates epicyclic rotation of planet gears 79 to thus rotate platform 77/outer shaft 71. While not required, bearing set 89 may be interposed between coaxial shafts 53 and 71 to further facilitate smooth independent rotation of the shafts.

Figure 2:
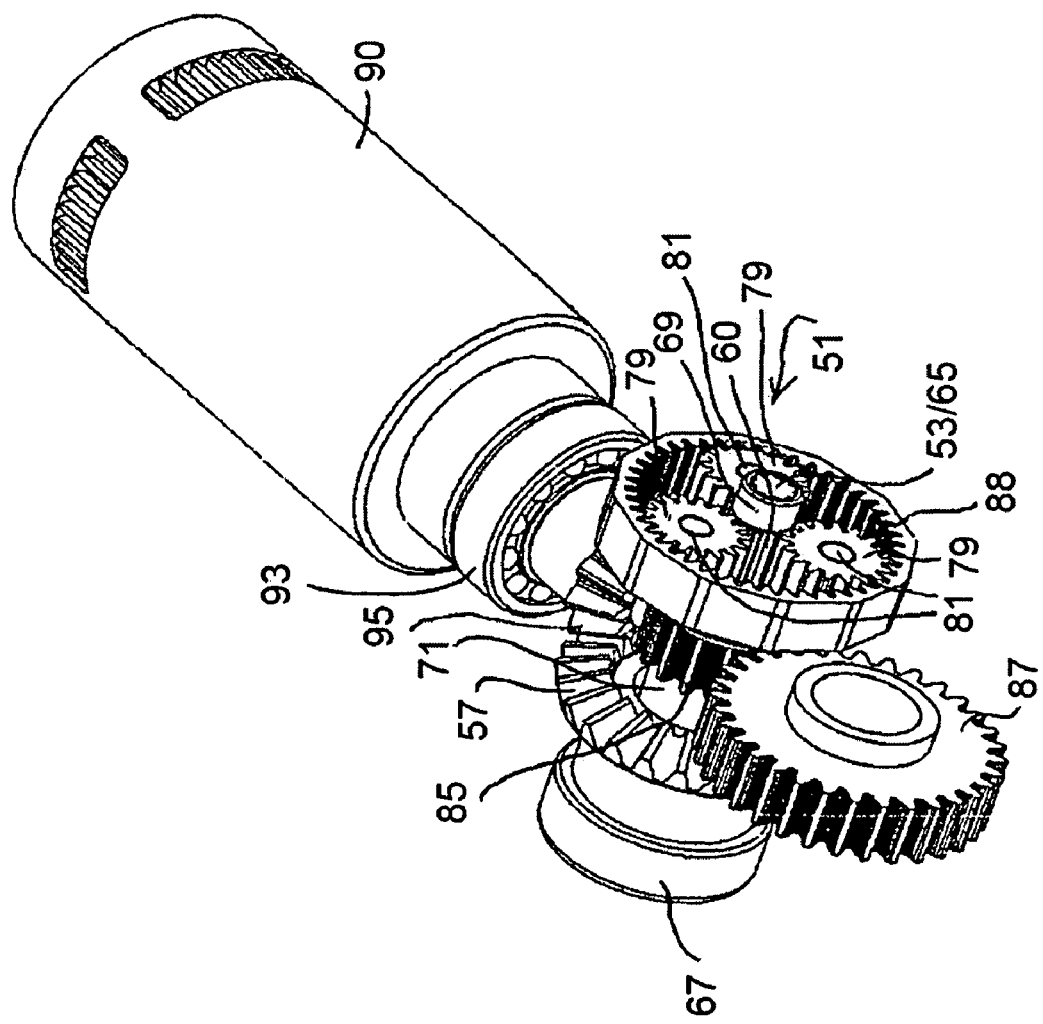
FIG. 2 is another perspective view of the drive of FIG. 1 associated with an input motor.
Figure 3:
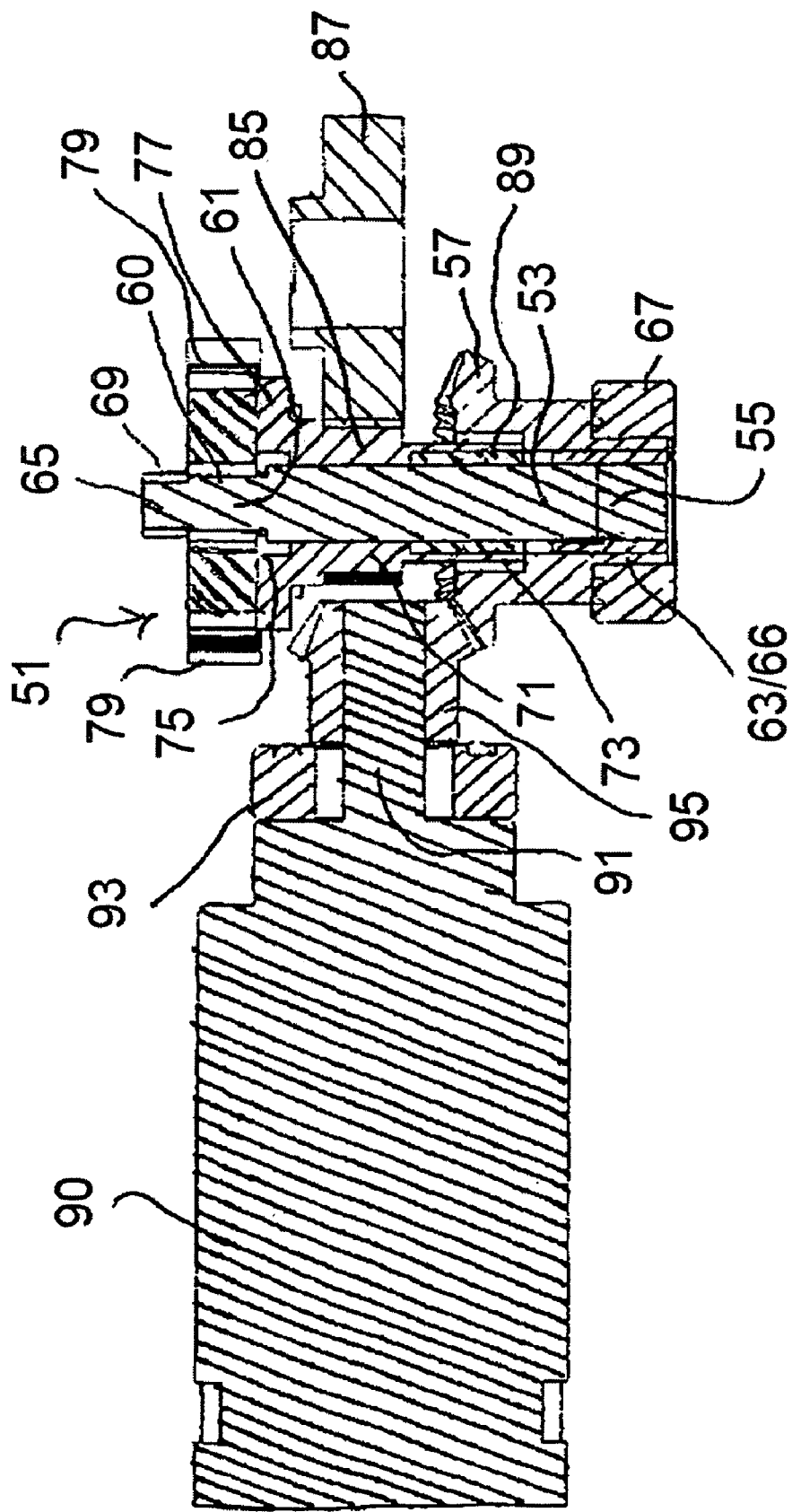
FIG. 3 is a sectional view of the drive as illustrated in FIG. 2.
Figure 4:
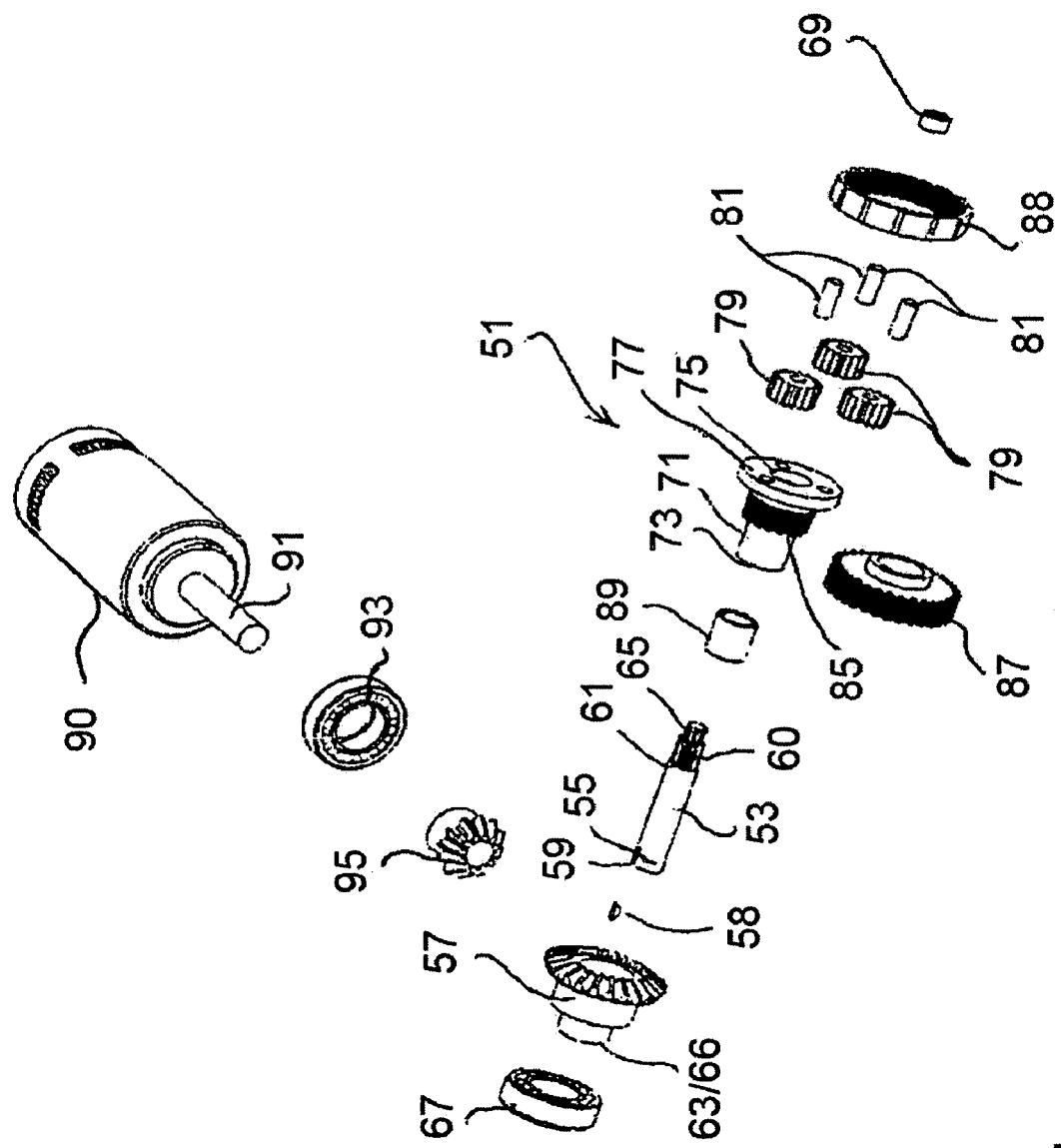
FIG. 4 is an exploded view of the drive as shown in FIG. 2.
Figure 5:
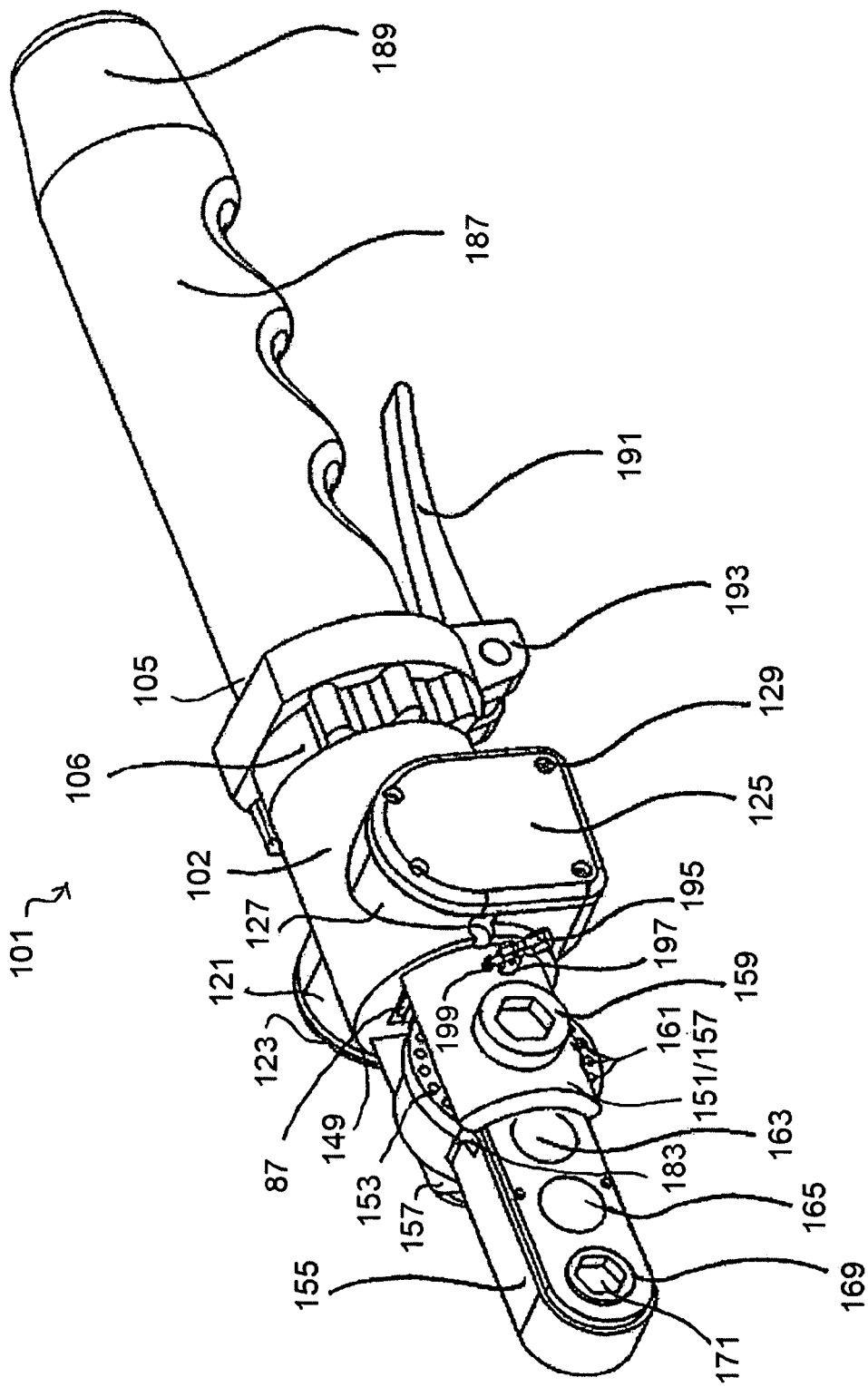
FIG. 5 is a perspective view of a first embodiment of apparatus of this invention (a nut runner) utilizing the drive in accord with FIG. 1.
Figure 6:
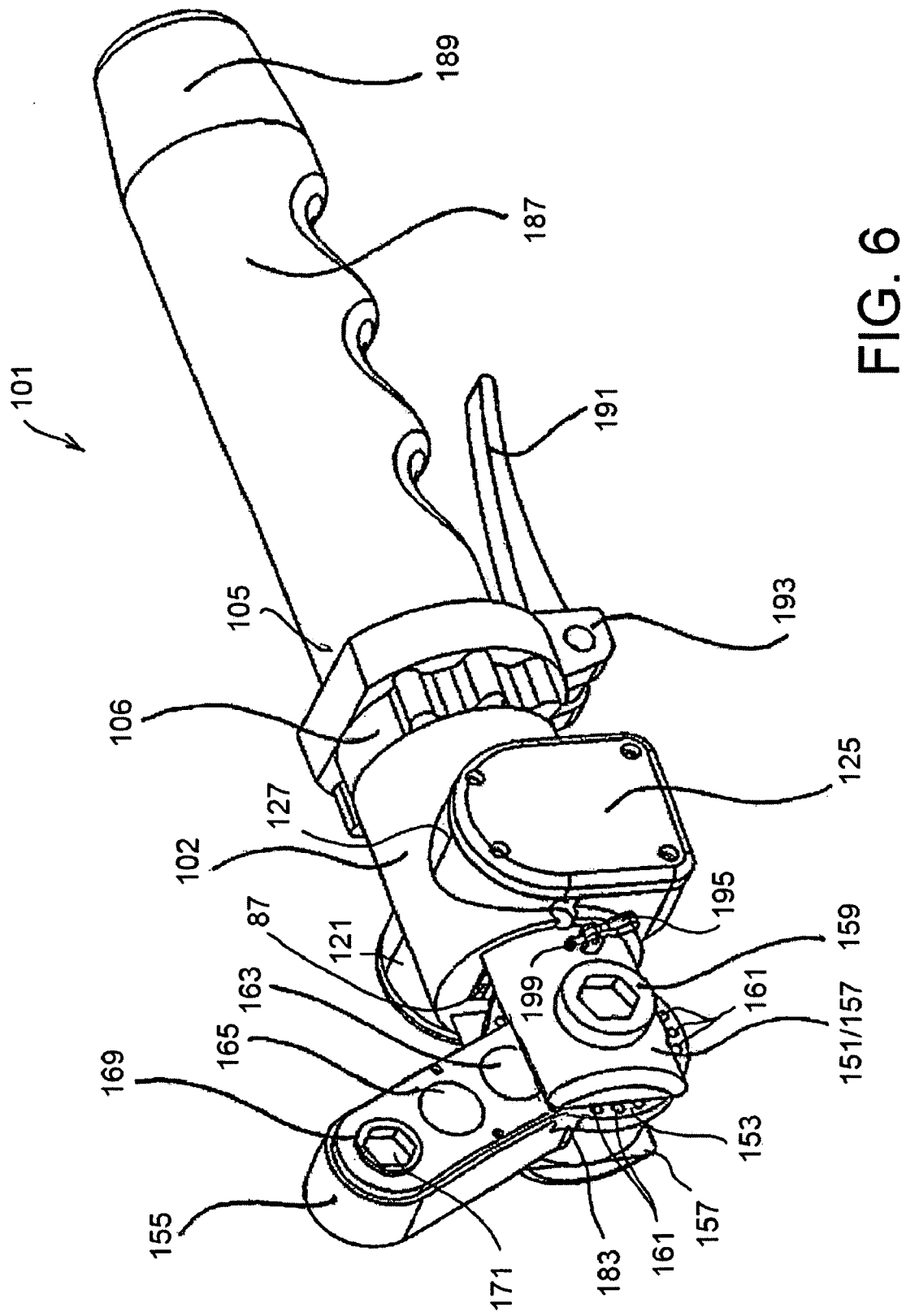
FIG. 6 is another perspective view of the apparatus of FIG. 5.
Figure 7:
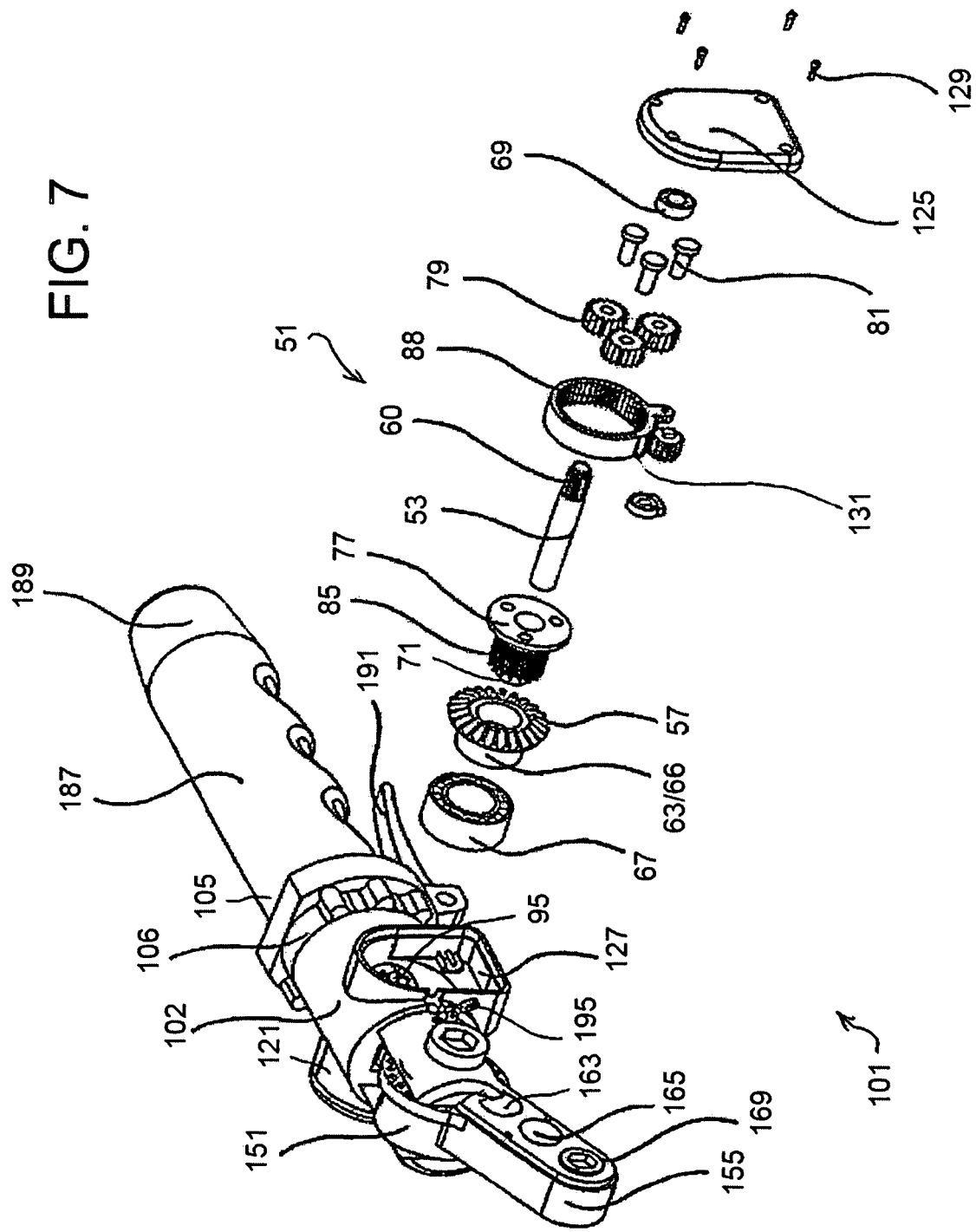
FIG. 7 is partially exploded view of the apparatus of FIG. 5.
Figure 8:
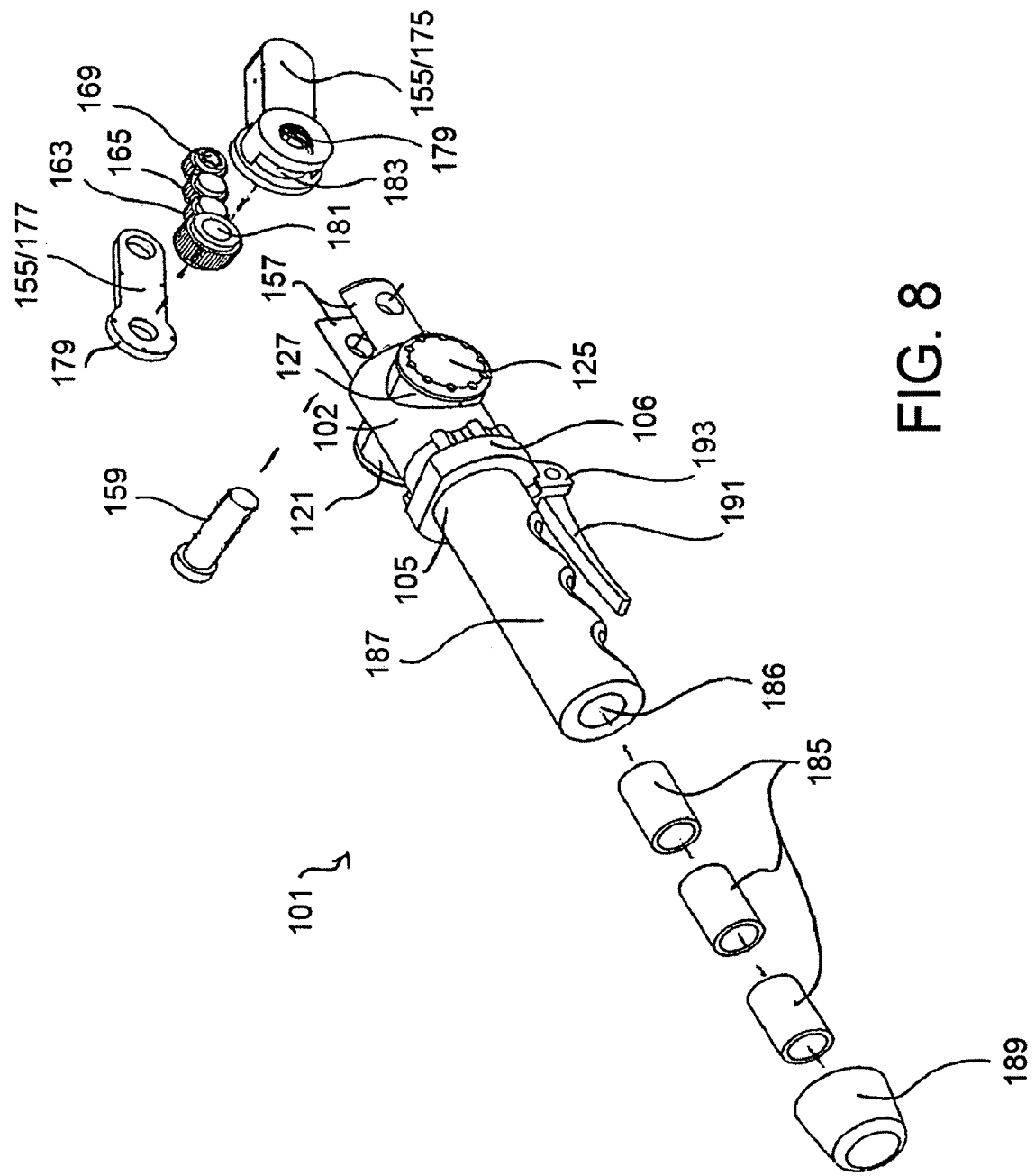
FIG. 8 is another partially exploded view of the apparatus of FIG. 5.
Figure 9:
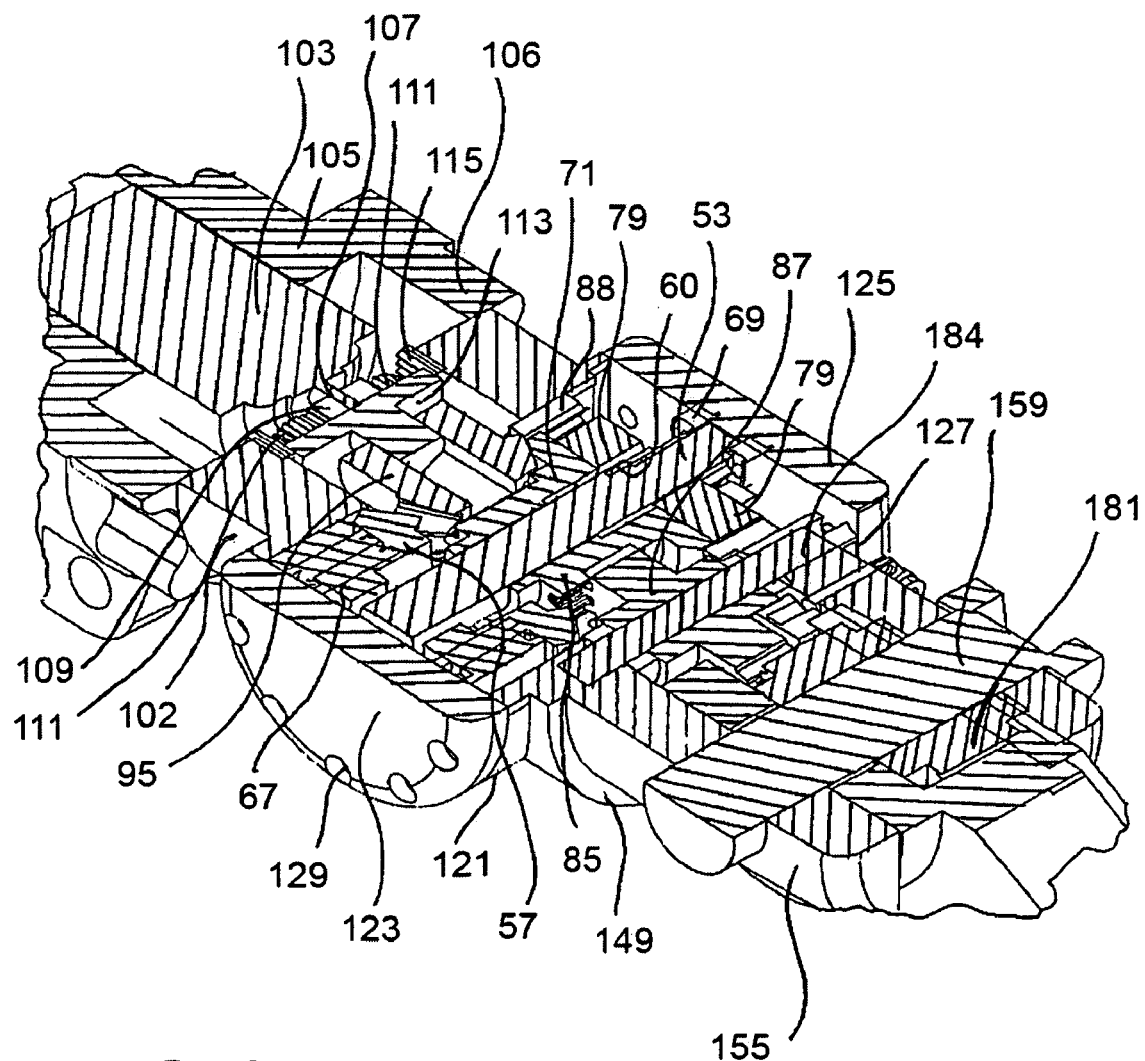
FIG. 9 is a partial sectional view of the apparatus of FIG. 5.

In one implementation, for use as a torque multiplying drive as illustrated in FIGS. 2 through 4, rotation of inner shaft 53 is accommodated at a source such as electric motor 90 with output shaft 91 thereof rotatably supported on a bearing surface 93 and coupled to a rotatable element such as a worm gear or, as illustrated, beveled pinion gear 95 engagable at right angle translate gear 57. Rotation of shaft 53 and thus sun gear 60, within outer shaft 71 and through platform 77, rotates planet gears 79 which in turn rotate epicyclically in ring gear 88. Platform 77 and outer shaft 71 are thus rotated coaxially in the same direction but at a torque amplified rate as shaft 53 (thus completely independently from shaft 53) thereby rotating transmittance 85 and output gear 87 coupled thereto. The location of high torque loads is thus shifted within the power train from a position of weakness to one of strength by allowing multiple planet gears to share the stress and strain of highly developed radial torque moments at a point after power drive direction change. By way of example and as shown, torque multiplication is two to one between transmittance 85 and gear 87 and six to one at platform 77 simultaneously. Multiplying the reduction created at bevel gear 57 and pinion gear 95 (two to one), a total torque multiplication of 24 to one across drive 51 is realized.

As may be appreciated from the foregoing, in this manner shaft 53 serves two purposes: first, as a drive for sun gear 60 of the planetary; and second, as the sole support axle for hollow outer shaft 71 and transmittance 85. The output drive (transmittance 85 in this arrangement) is located centrally in the drive train instead of at the drive train's end. Selected torque translation (multiplication in the arrangement illustrated in FIGS. 2 through 4) is thus realized in a very compact space after right angle power input translation. By reversing the input/output (for example, linking motor or other rotational input at transmittance 85 and output at drive output 57), rotational speed translation (speed increase) is achieved across the drive in a very compact mechanism. Right angle bevel gear sets in this application can be smaller thereby reducing friction losses and lowering horse power requirements.

Drive 51 may be usefully deployed in a variety of utility apparatus providing selected actuating characteristics. The torque translative drive could be utilized in place of current actuators for airplane landing gear, airplane flap extenders, ailerons, elevators, and rudders in aircraft, door closers, propeller speed reducers for aircraft, boat motors or windmills, in power tools, pumps, valve actuators, medical devices such as dialysis machines and blood pumps, in winches, deployment and positioning of solar panels and arrays, mining equipment (in large drive configurations, for driving cutting wheels where extremely high torque is utilized, for example), car and motorcycle transmissions, electric cars, satellite component deployment, bicycles, wheel chairs, power seats and windows, stair climbing dollies, robotic structures, vending machines, and many other many other applications.

In accord with another aspect of this invention, specific illustrative embodiments of utility apparatus utilizing drive 51 of this invention are shown in the remaining FIGURES. Articulated nut running apparatus 101 is illustrated in FIGS. 5 through 11. Drive 51 is integrated thereinto as shown at housing 102.

Motor 103 in motor housing section 105 at handle 106 rotates drive shaft 107. Shaft 107 includes, or is connected with, sun gear 109 at one end thereof positioned for meshed engagement with an idler gear set including gears 111 (preferably three gears) rotatably mounted on planetary carriage 113 (see FIG. 9). Stationary ring gear 115 is pressed into one of the four intersecting junction hubs of housing 102 for facilitating rotation of gears 111 in orbit around sun gear 109 to thus rotate carriage 113 and thereby increase torque to pinion gear 95. A thrust bearing may be employed to support and hold the components in operative engagement. Pinion gear engages right angle translate bevel gear 57 of drive 51. Drive 51 is held in housing 102 between hub bearing 67 pressed into transverse junction hub 121 capped with cover 123 and hub bearing 69 pressed into hub cover 125 at transverse junction hub 127. The covers are attached with machine screws 129.

A torque measuring arrangement is provided at ring gear 88. Ring gear 88 herein includes a ring gear segment 131 (see FIGS. 7, 10 and 11) at its outer annulus in mated engagement spur gear 133 rotatably mounted on axle 135 in hub 127. Ring gear 88 will ordinarily thus be rotatable (on a needle bearing or the like pressed into hub 127) across a limited arc defined by limiter arm 137 held between sector wall 139 and compression springs 141 and 143 at spring housing 145 to drive a potentiometer connected with axle 135. Ring gear 88 is biased against rotation at torque reaction limiter arm 137 by elongated compression spring 141 having a spring rate just high enough to insure that ring gear 88 returns to its home position (illustrated at FIG. 11) at the end of every nut/fitting installation. Spring 141 is longer than larger diameter spring 143 within which it is coaxially mounted, spring 143 having a larger calibrated rate. Reaction arm 137 overcomes spring 141, which provides very low resistance to rotation of ring 88, during initial operation of nut running apparatus 101 as discussed hereinafter to thus detect any interference to rotation of the gear train. Once the end of the small diameter spring is compressed, arm 137 comes into contact with the large diameter calibrated spring 143 used to correlate movement of the ring gear to torque values (see FIG. 10). Since ring gear reaction arm 137 is collocated with the planetary, the spring is subjected to only a fraction of the torque thus allowing use of smaller and lighter springs.

End hub 149 of nut runner apparatus 101 includes angle adjustable mount 151 including angle selection hub 153 at one end of nut runner housing 155. Hub 153 is rotatably mounted in mount bracket 157 and secured by pin axle 159 and includes indexing detents 161 circumferentially located at the periphery thereof that are engagable by a pin as described hereinafter for location of housing 155. Nut runner housing 155 rotatably supports a set of inline gears 163, 165 and 169, with the final gear provided with a hex socket 171 for drivable engagement with a fastener (see FIGS. 5, 6 and 8). Housing 155 includes gear mounting body 175 and cover 177, with drive gear hub portion 179 receiving drive gear 181 therein. Drive gear 181 is in engagement with the first of the inline gears (163) to drive the runner end and is rotatably maintained on axle 159. Drive gear 181 is in turn driven by output gear 87 engaged at transmittance 85 from drive 51, gear 87 rotatable on axle 184. Hub portion 179 at body 175 includes slot 183 thereat describing the allowable arc of rotation for housing 155 on mount 151.

Motor 103 is a battery operated electric motor, batteries 185 being housed in hollow interior 186 of handle grip portion 187 and secured thereat by compartment cover 189. Motor power is actuated by trigger 191 pivotably mounted on trigger housing 193. Pivot boss pin handle 195 is pivotably located on mount 197 and includes biasing means for biasing pin 199 secured at the end thereof and slidably maintained through one side of mount bracket 157 into engagement with a selected one of the indexing detents 161. Depressing handle 195 withdraws pin 199 from the selected detent allowing rotation of housing 155 to a new desired angle of operation.

Figure 12:
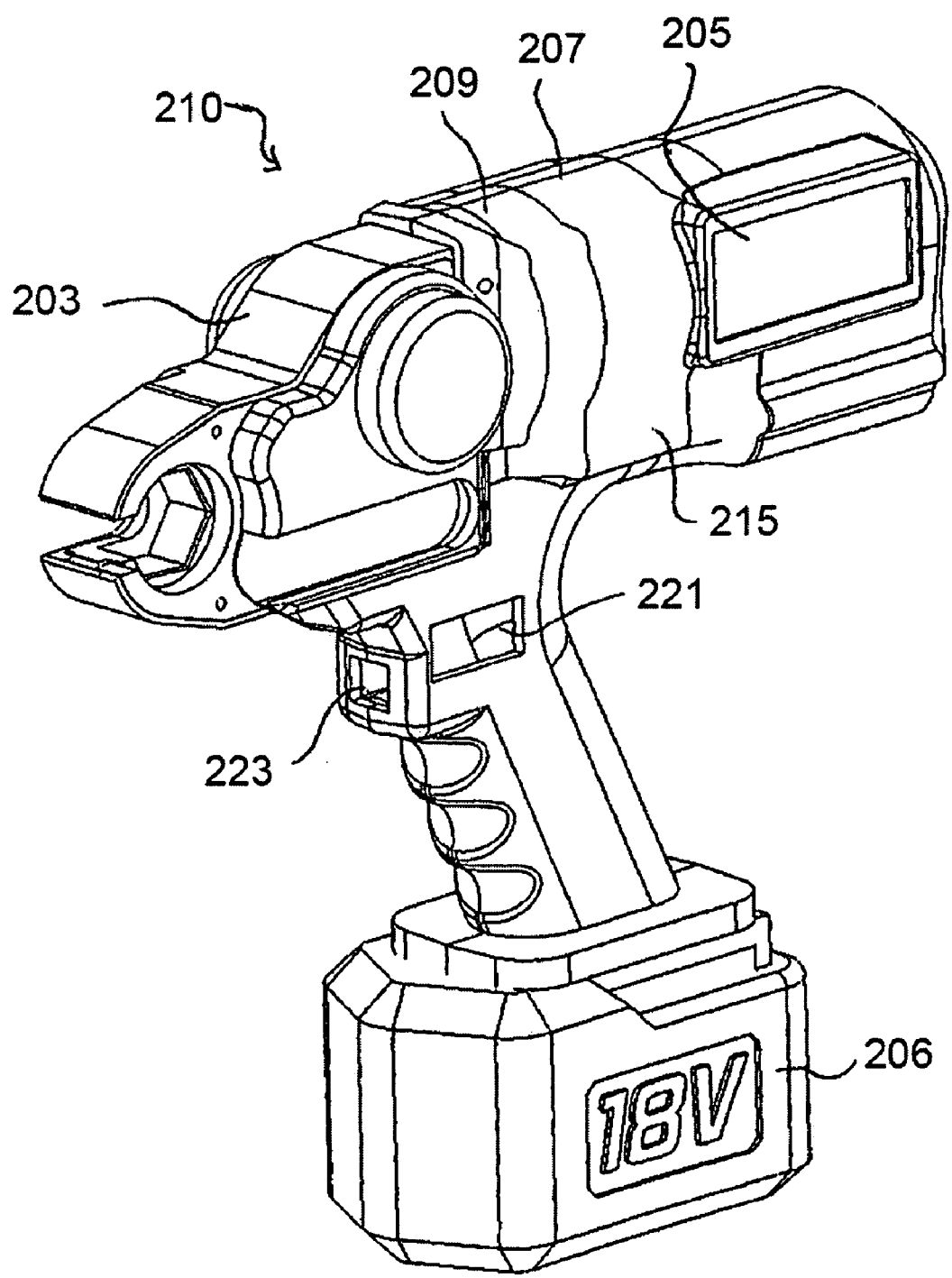
FIG. 12 is a perspective view of a second embodiment of apparatus of this invention (a socket driver) utilizing the drive in accord with FIG. 1.
Figure 13:
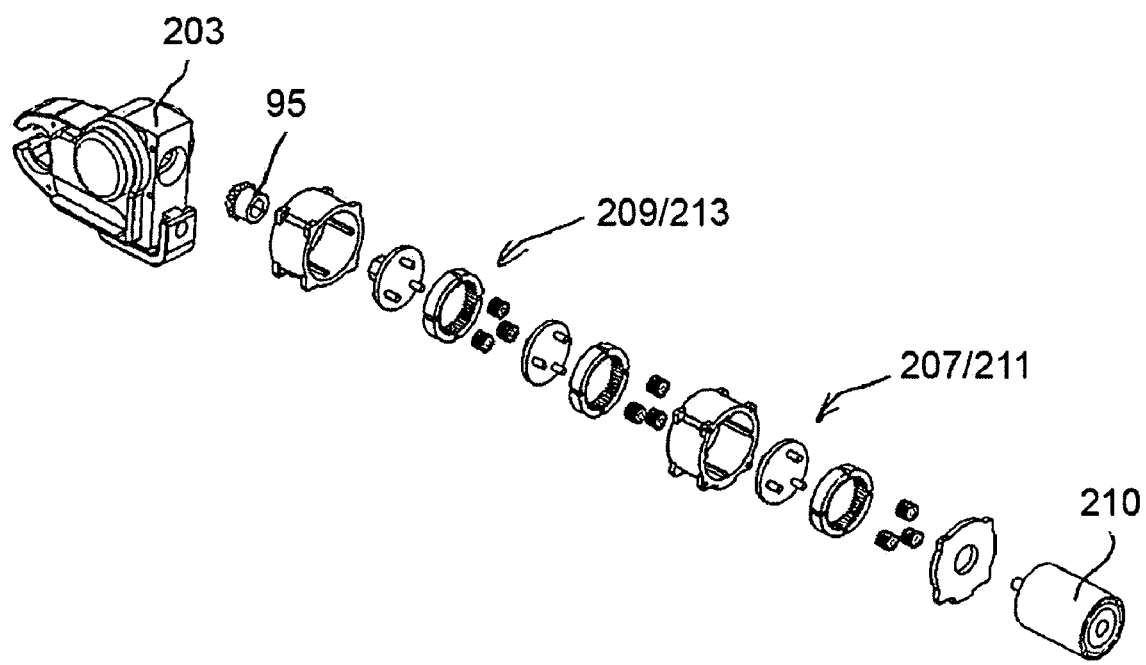
FIG. 13 is a partially exploded view of the apparatus of FIG. 12.

A socket driver apparatus 201 of a known type is illustrated in FIGS. 12 through 14 but utilizing drive 51 integrated thereinto. This driver is a battery powered driver for rotating tools such as sockets or the like to manipulate threaded connectors. The driver includes a driver head 203, motor module 205 and battery pack 206. Torque amplification drive train modules 207 and 209 are entrained after motor 210 to provide torque amplification stages utilizing known planetary sets 211 and 213 to rotational source (output pinion) 95. Housing 215 houses all driver components and is defined by housing portions 217 and 219.

Operational switches are readily accessible, including main on/off switch 221 and main operational running switch/trigger 223. Various other controls may be provided. Head 203 includes main body 225 and top cover 227 held together using screws. Gapped jaw 229 is utilized in this embodiment of the driver to accommodate use of a split socket tool 231 (a hex socket, for example) used to manipulate line fittings. Drive translate gear 57 is conventionally bearing mounted in main body 225, pinion 95 engaging gear 57, and gear 57 mounted to inner shaft 53 of drive 51. The opposite end of shaft 53 is mounted through bearing 69 pressed into drive cover 235 affixed over ring gear 88 mounting 237.

Main drive output gear 87 and socket tool 231 are rotatably mounted on integral shoulders in cavities of main body 225 as are idler gears 239 and 241 in mesh with gear 87 and tool 231. Drive gear 225 is engaged at transmittance 85 of outer shaft 71 of drive 51. Idler gears 111/113 are used in split socket applications, providing constant drive application to socket tool 231. Main drive gear 225 and socket tool 231 are preferably the same size and have the same gear tooth count so that rotation thereof is one to one.

Motor 210 rotates planetary gear set 211 of torque amplification module 207 which in turn rotates gear set 213 of module 209 keyed to drive pinion gear 95 in drivable mesh with bevel gear 57. As disclosed hereinabove, drive 51 is thus actuated with output transmittance gear 85 driving main gear 87 and thus tool 231. Utilization of a reaction arm 137 on ring gear 88 and related components such as disclosed hereinabove (FIGS. 10 and 11) could be adapted for use with load cells (strain gauges or the like) to measure counterforce generated by reaction loads developed between the interaction planet gears 79 and ring gear 88. Loads thus measured could be utilized by operational programming at an onboard computer to minimize friction to bevel gear 57 by regulating input speeds to first stage planetary 207/211 thereby limiting inefficient input loads. These load reactions are scaled samplings of the total system load (based on gear reduction) thus enabling use of smaller and lighter springs and corresponding components and constructs.

A compact battery operated one man winching apparatus 251 is illustrated in FIGS. 15 through 24. Drive 51 is integrated thereinto as shown. This winch has many uses, and is particularly adapted in the embodiment illustrated herein for self rescue from a lower point to a higher point. The apparatus is compact and could be carried on a harness, and provides adequate torque to lift a full grown man. Transmittance 85 in this embodiment is a cable drum 253 for receiving the winching cable 257 (preferably a nylon cable) coiled thereon, cable 257 having an appropriate grapple 259 at the end thereof with a body 261 having deployable hooks 263 (see FIGS. 20 and 21, for example). Additionally a worm gear set accomplishes right angle drive translation at hypoid gear 57 in this embodiment, a more advantageous load holding arrangement (in case of battery failure for example).

Apparatus 251 includes housing 266 having handles 267 and grips 269 at the ends of main housing sections 271 and 273 (secured by screws 275). On-board computer control and operational selections (such on/off, grapple firing and take up and the like at control switches 276) are reported at read-out 277. Transverse housing modules 279 and 281 are secured conventionally to housing 266, housing 281 including wiring tunnel 283 for power and control transmissions. Cable outlet 285 includes multi-roller guide assembly 287 mounted on housing section 271.

Figure 21:
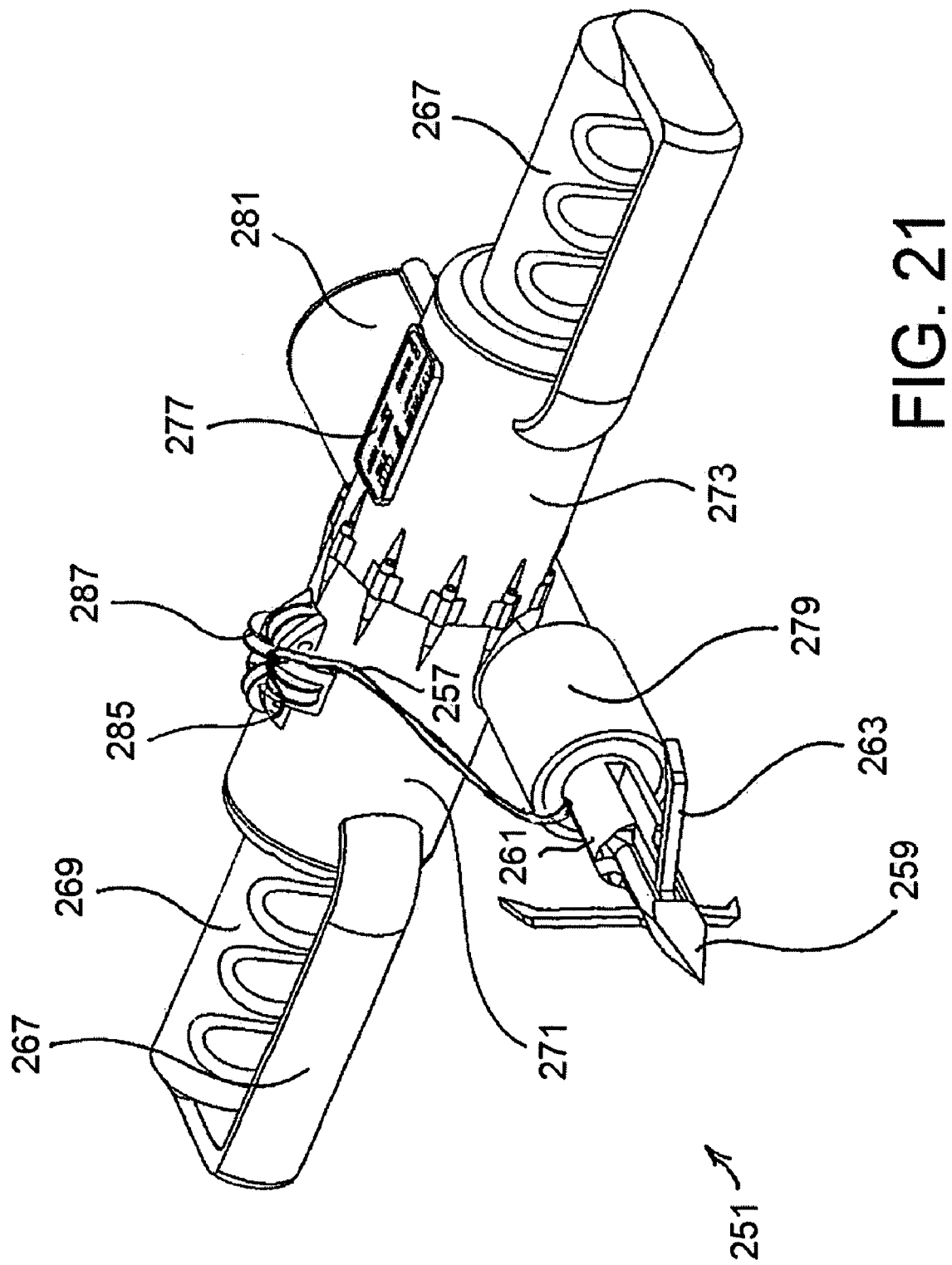
FIG. 21 is another perspective view of the apparatus of FIG. 15.
Figure 22:
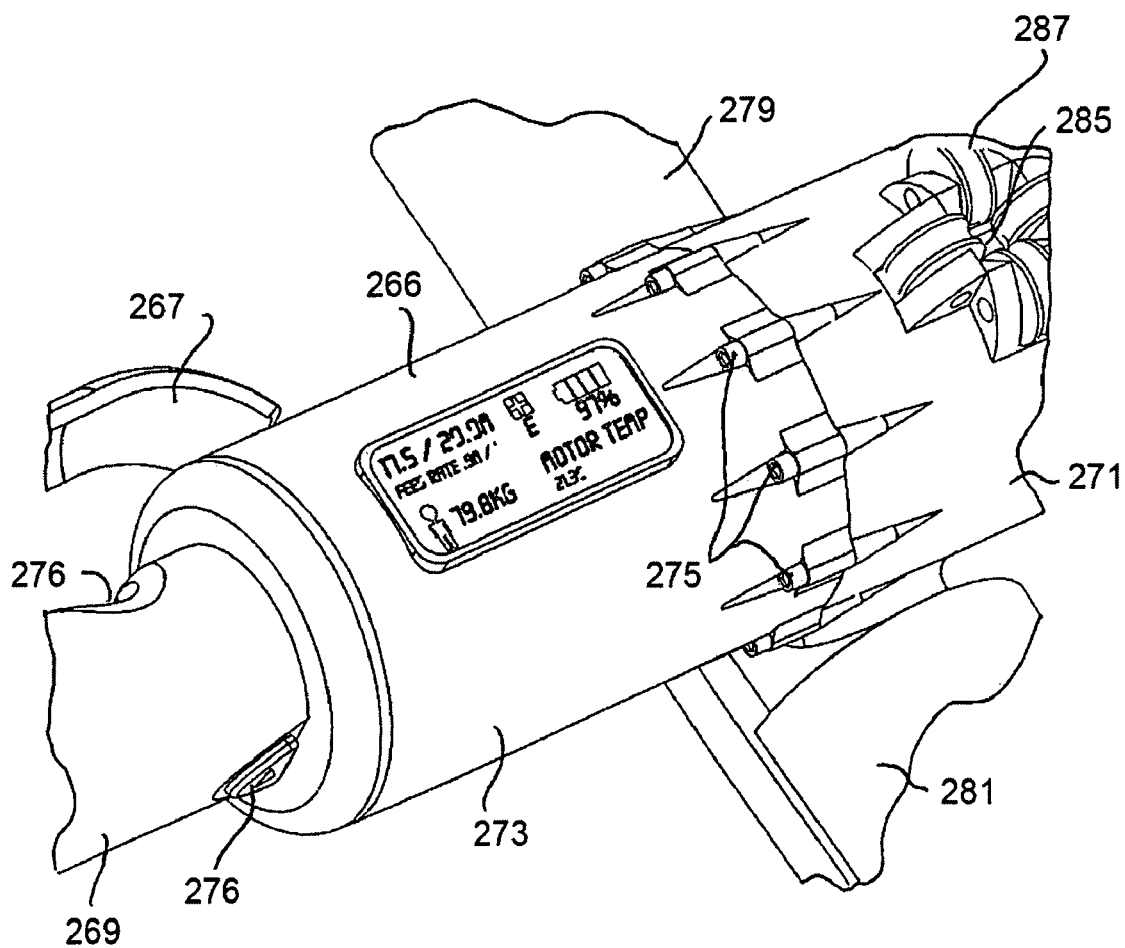
FIG. 22 is a detailed partial perspective view of the apparatus of FIG. 15.
Figure 23:
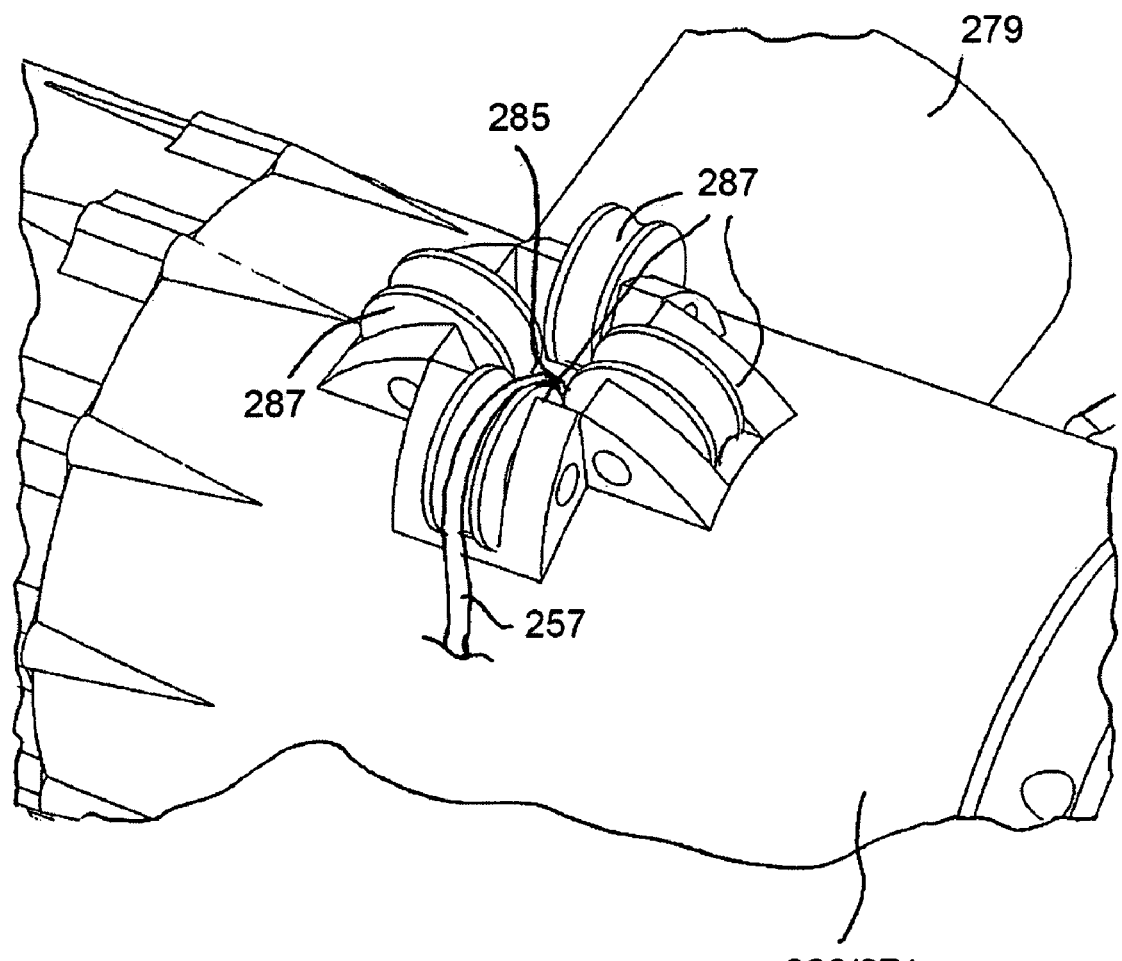
FIG. 23 is another detailed partial perspective view of the apparatus of FIG. 15.

Housing module 279 is an ejection tube and is sized to receive grapple body 261 sealingly therein (see FIG. 21). The ejection tube is in turn accessed at its opposite end by a pressure valve connected with high pressure cylinder 291 in battery compartment 293 of housing section 273 (see FIG. 18). Pressure is released from cylinder 291 into module tube 279 by actuation of one of the trigger switches 276 thereby firing grapple 259 and spooling cable 257 off drum 253 in a free-wheeling fashion. Batteries 295 for powering up the computer, switching controls 276 and motor 297 are held in peripheral cells of battery compartment 293. Housing section 273 end cap 299 is threadably maintained at the end of section 273 and has handle/grip 2667/269 affixed thereto.

Figure 16:
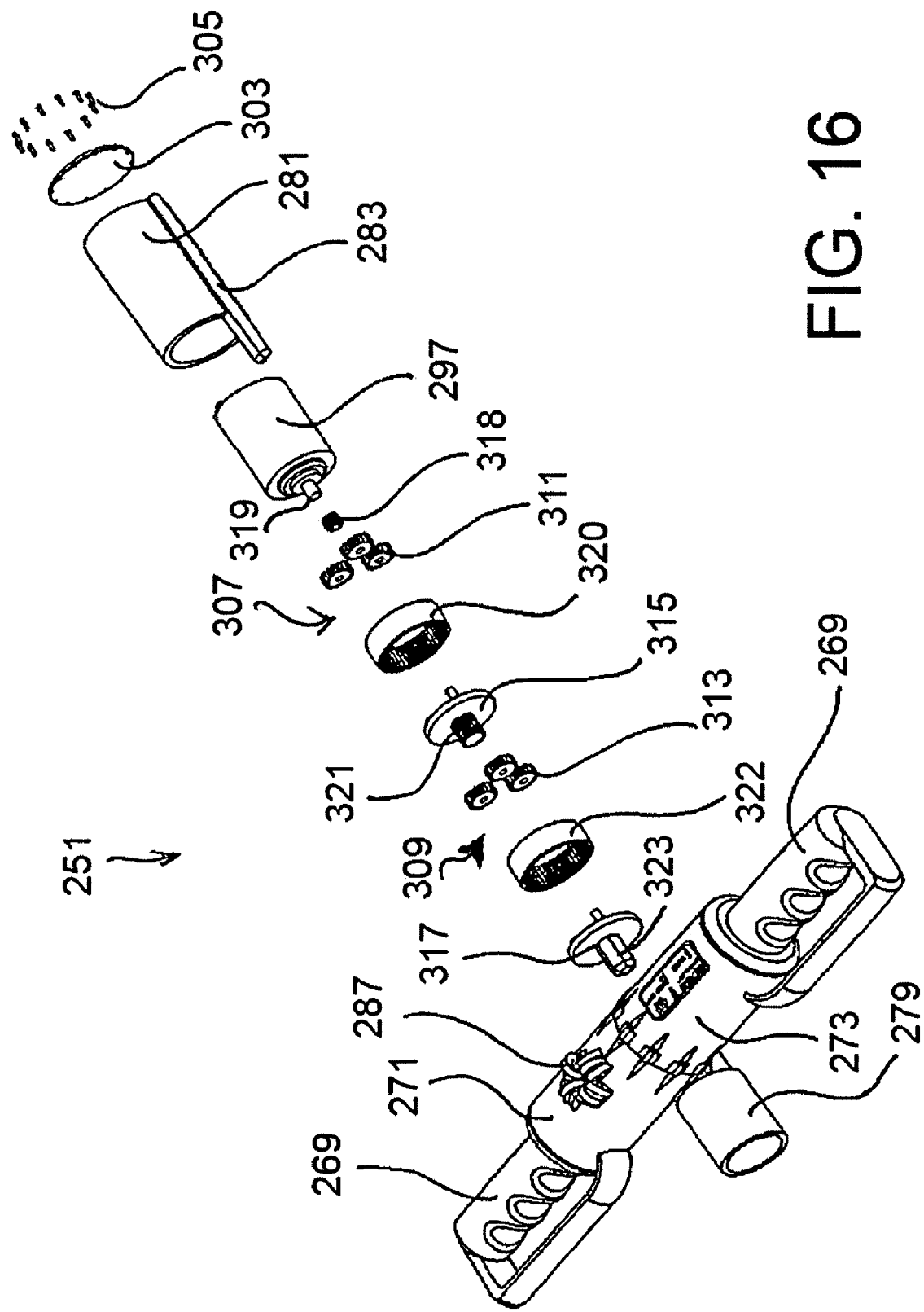
FIG. 16 is a partially exploded view of the apparatus of FIG. 15.
Figure 17:
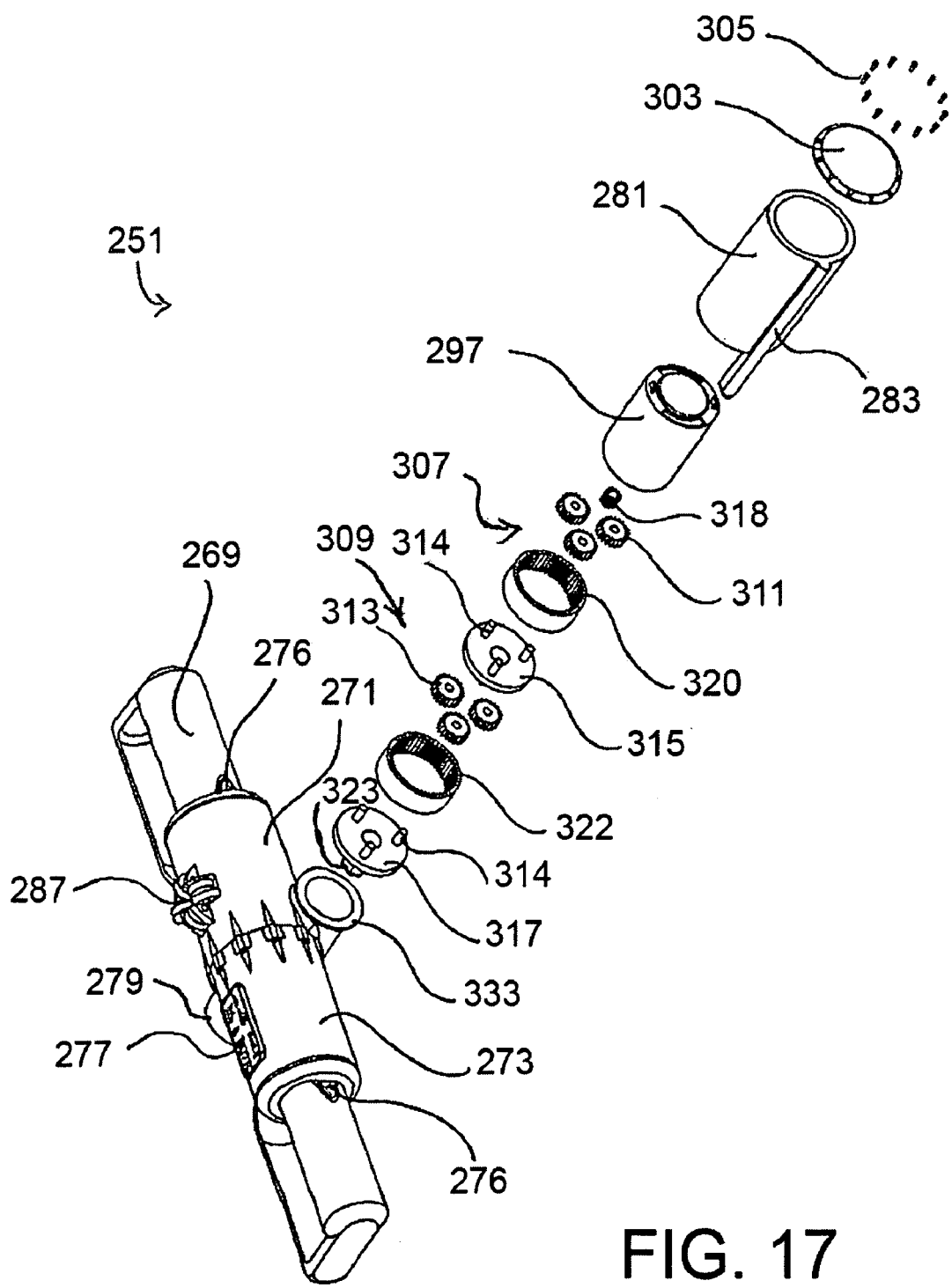
FIG. 17 is another partially exploded view of the apparatus of FIG. 15.
Figure 18:
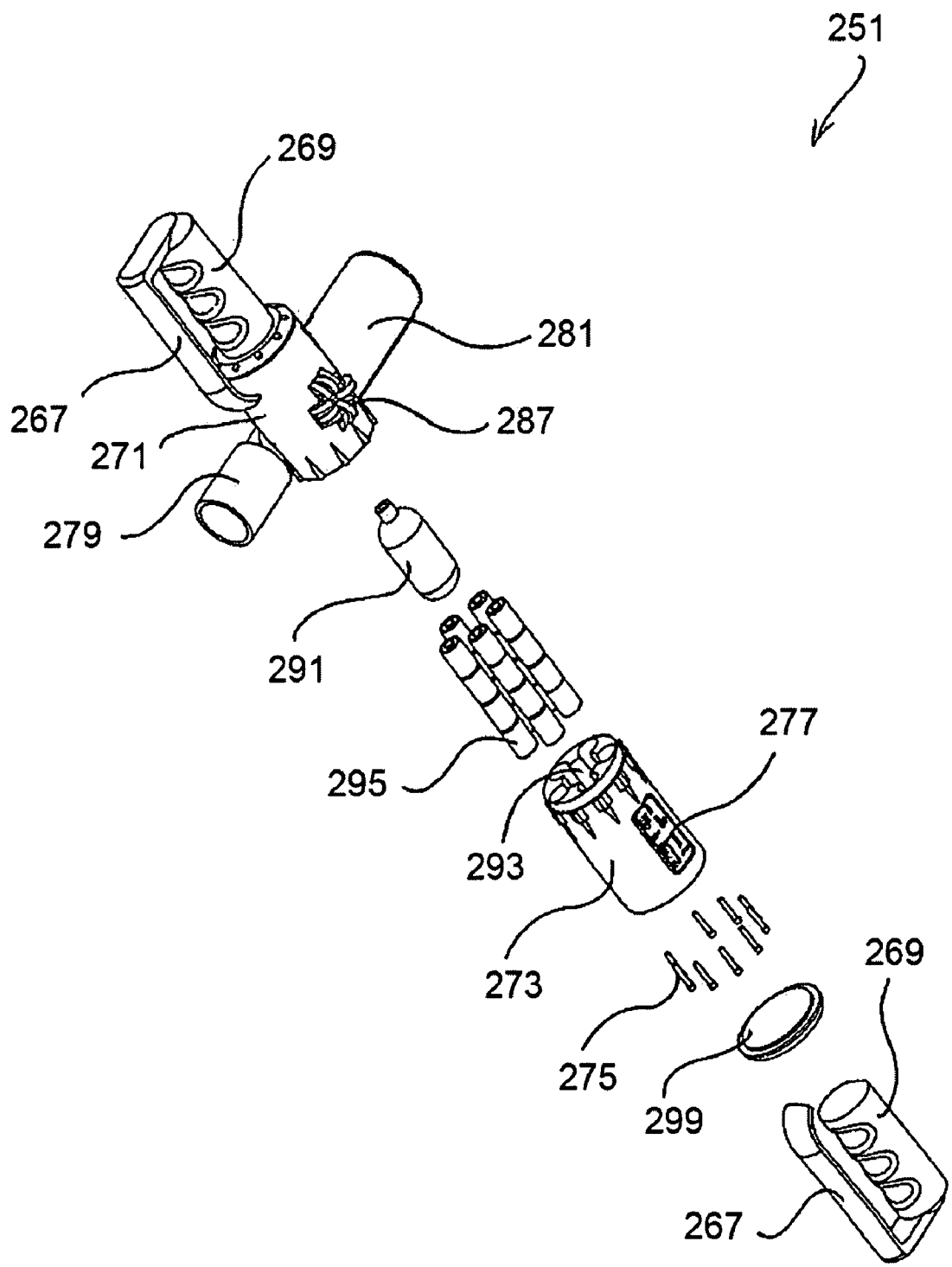
FIG. 18 is yet another partially exploded view of the apparatus of FIG. 15.
Figure 19:
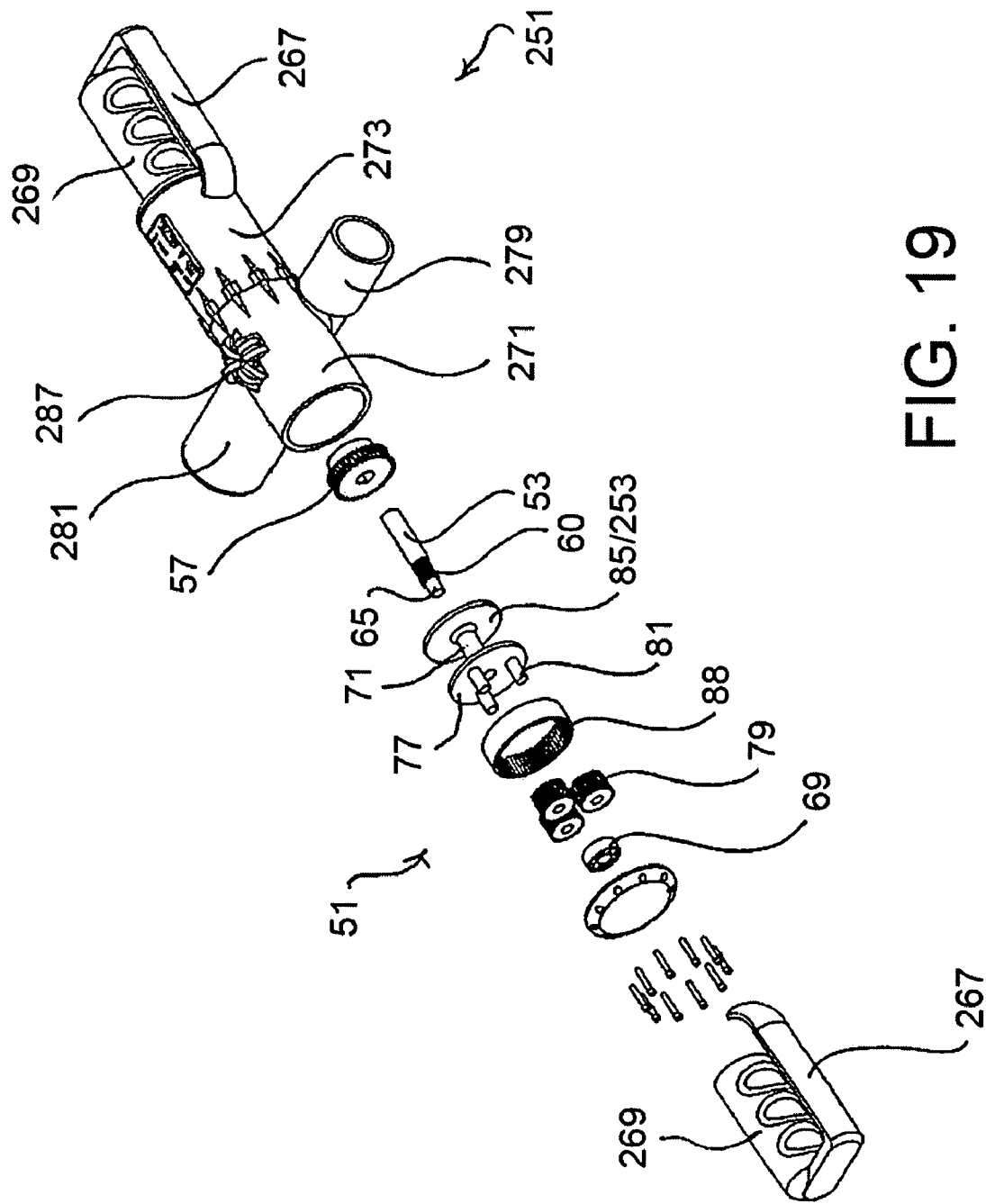
FIG. 19 is still another partially exploded view of the apparatus of FIG. 15.

As shown in FIGS. 16 and 17, housing module 281 includes end cap 303 maintained thereon by screw 305 and houses motor 297 therein together with torque multiplication stages 307 and 309. Stages 307 and 309 include planet gear sets 311 and 313, respectively, mounted on axles 314 of planetary carriages 315 and 317, respectively. Sun gear 318 mounted on output shaft 319 of motor 297 is held in mesh with planet gears of set 311 which are driven in orbit within ring gear 320. This stage reduces the output speed of the motor while increasing the torque by a value equal to the number of teeth in the sun gear divided into the number of teeth in the ring gear plus one. Sun gear 321 is formed on the back face planetary carriage 315 and provides input torque to stage 309 in substantially the same arrangement as stage 307. Gear set 313 orbits in ring gear 322 to rotate carriage 317 thereby serving to multiply the output torque of stage 307.

Figure 24:
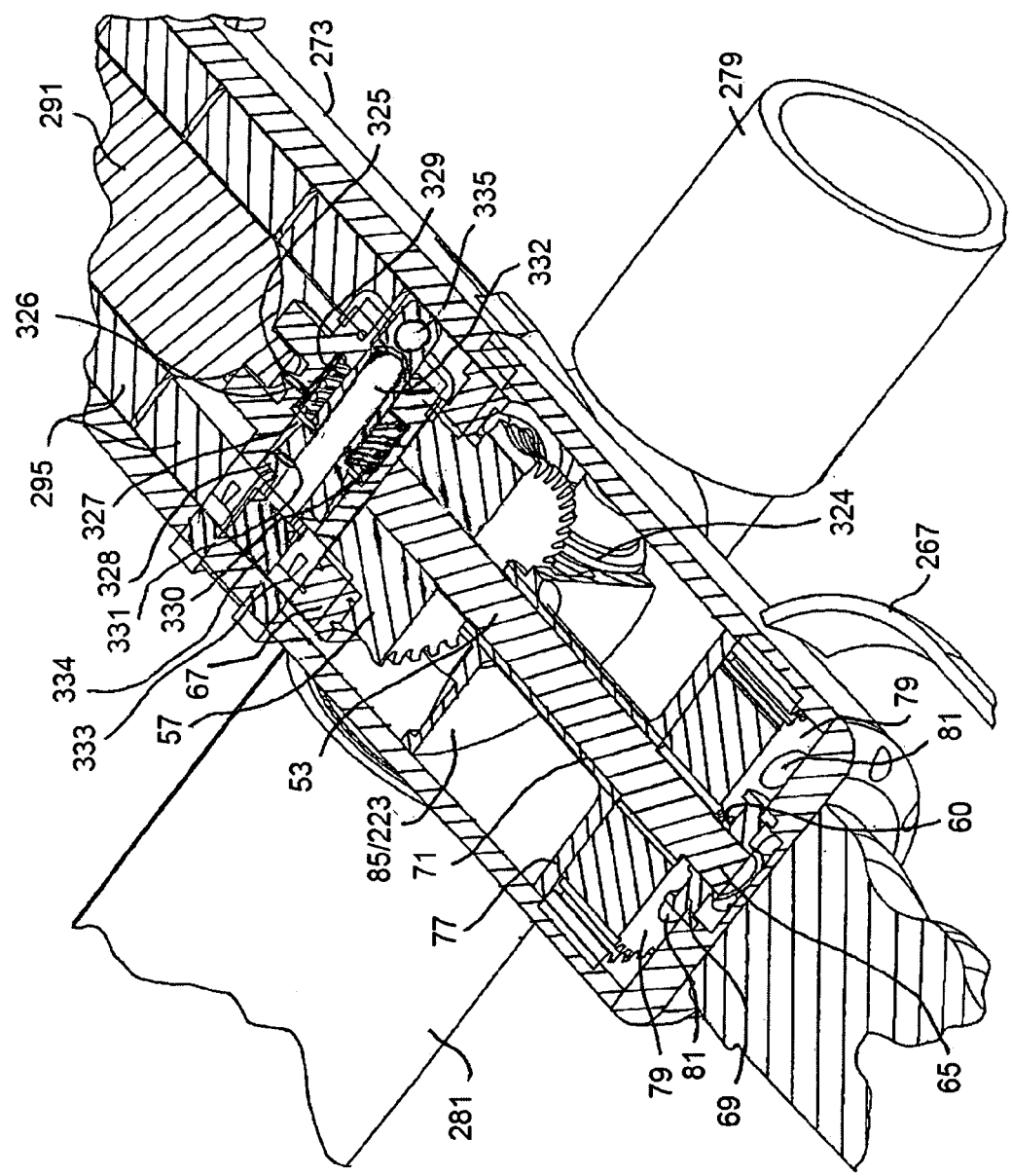
FIG. 24 is a partial sectional view of the apparatus of FIG. 15.
Figure 25:
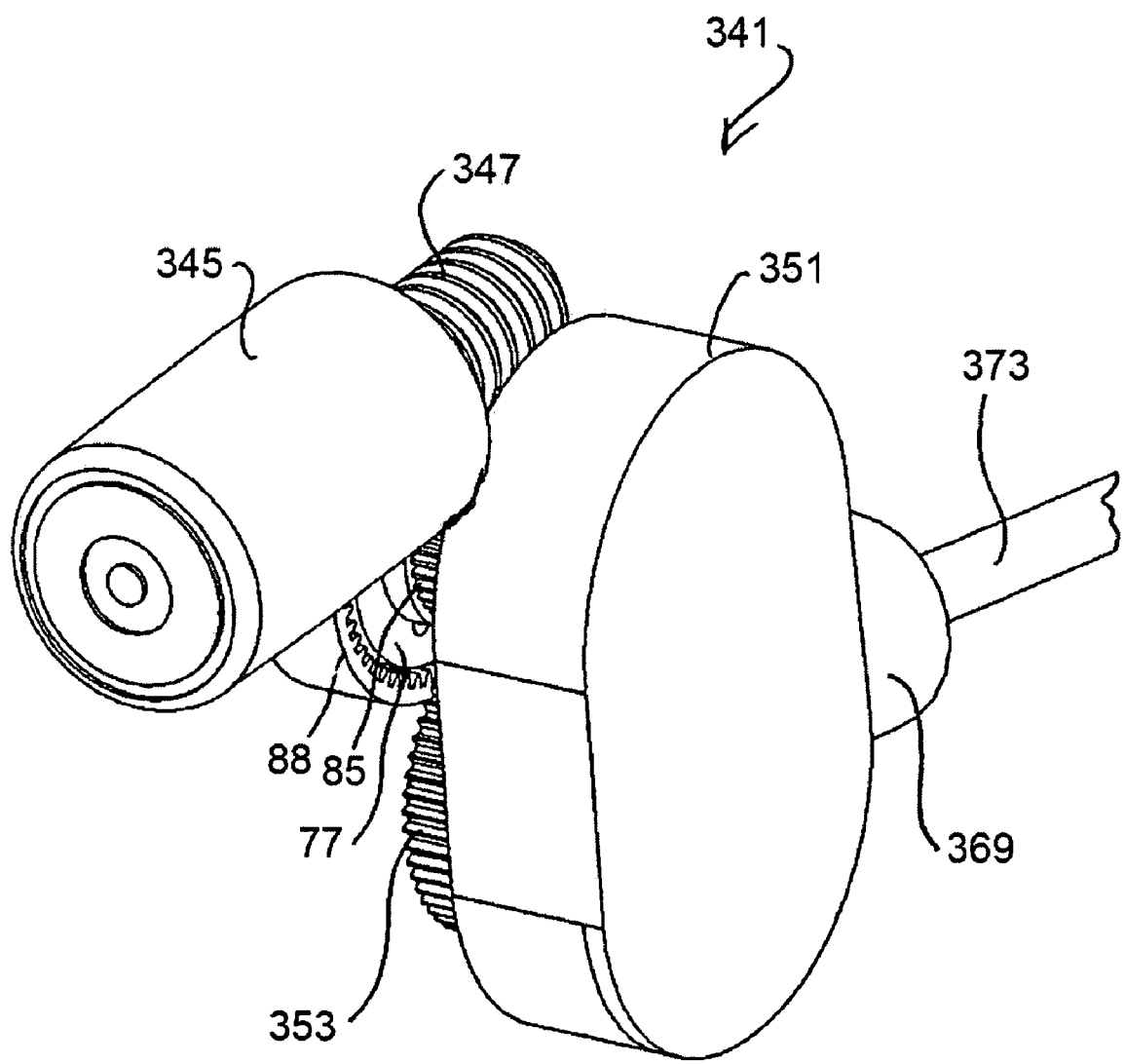
FIG. 25 is a perspective view of a fourth embodiment of apparatus of this invention (a hydraulic piston pump) utilizing the drive in accord with FIG. 1.
Figure 26:
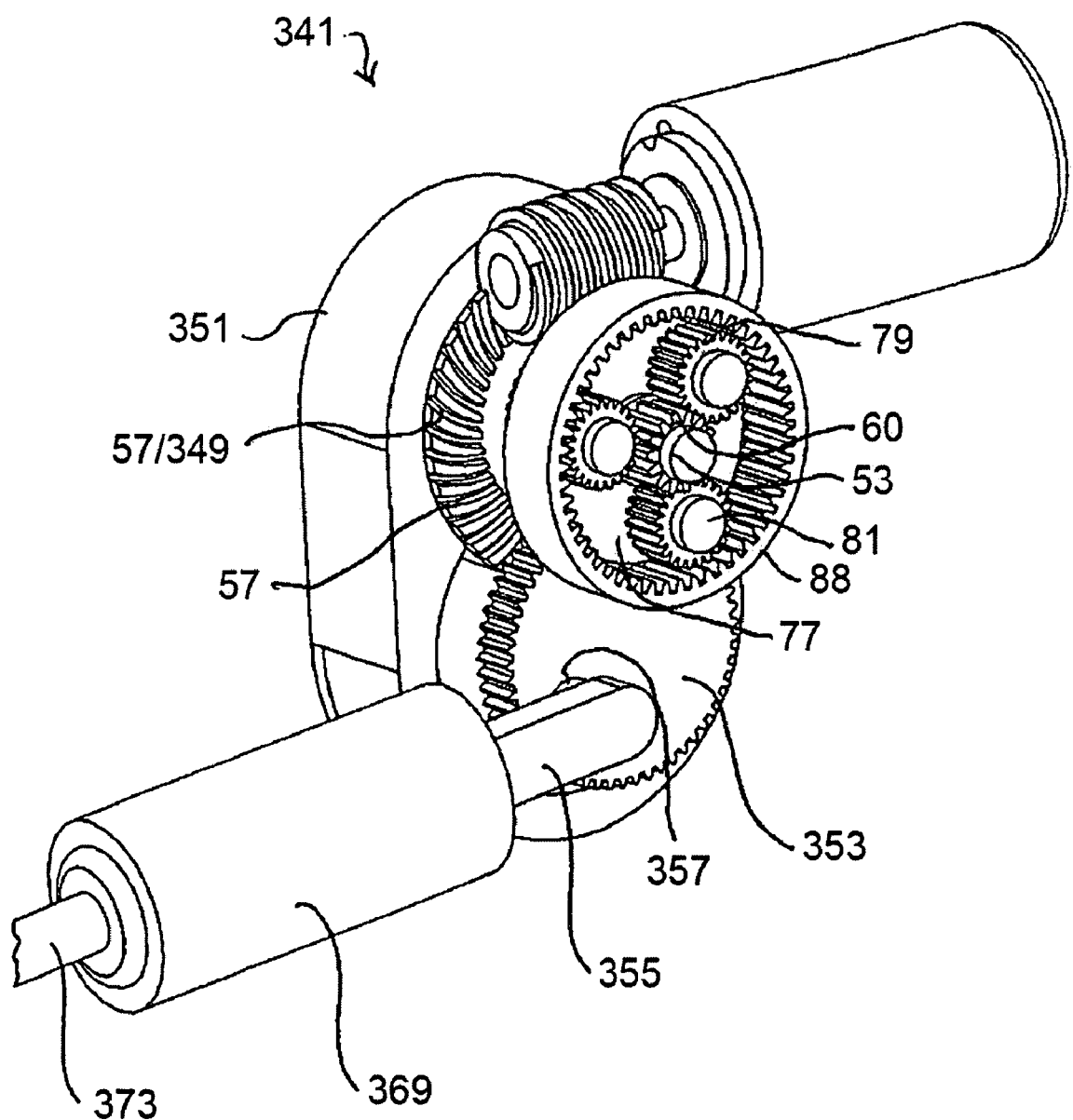
FIG. 26 is another perspective view of the apparatus of FIG. 25.
Figure 27:
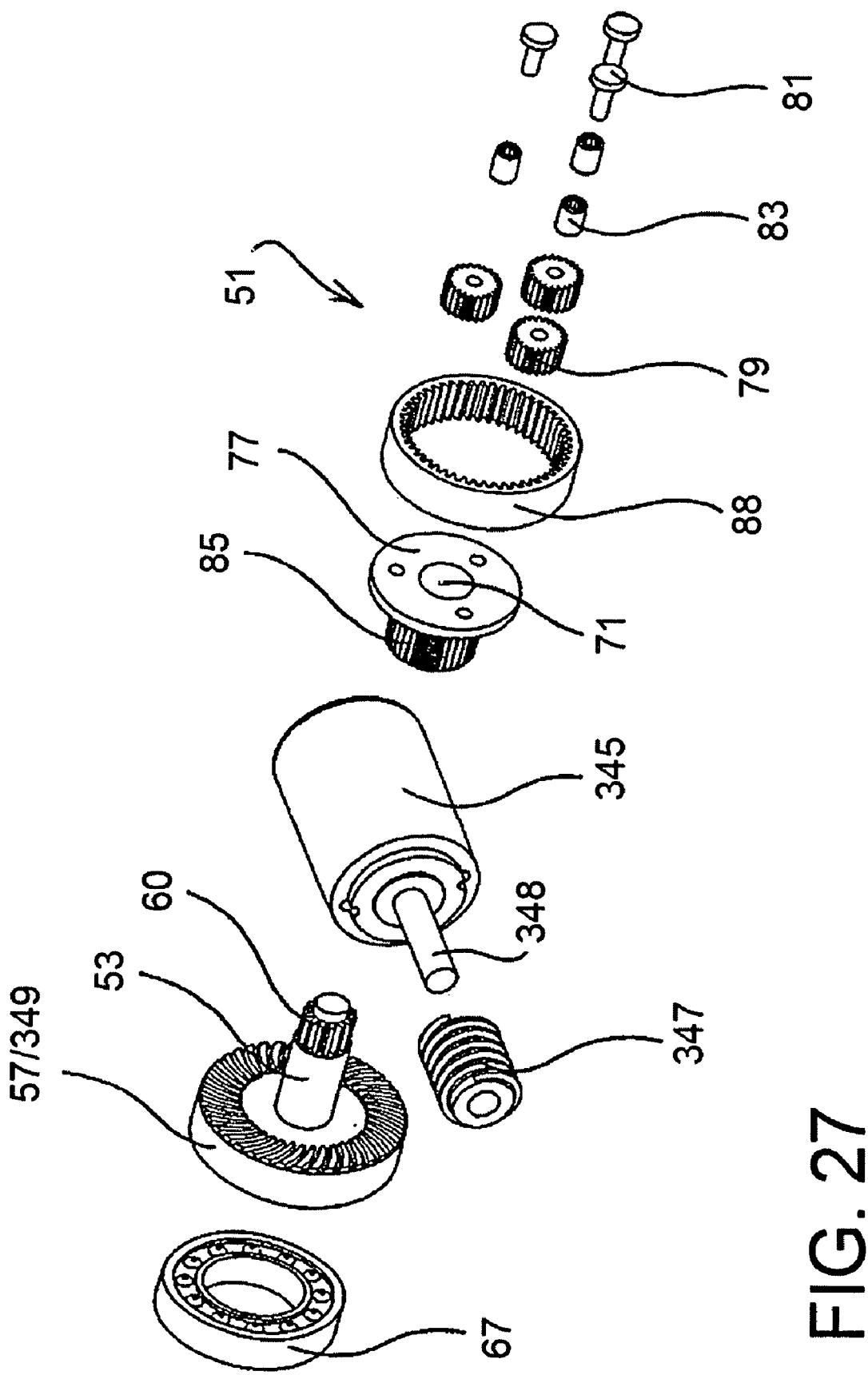
FIG. 27 is a partially exploded view of the apparatus of FIG. 25.
Figure 28:
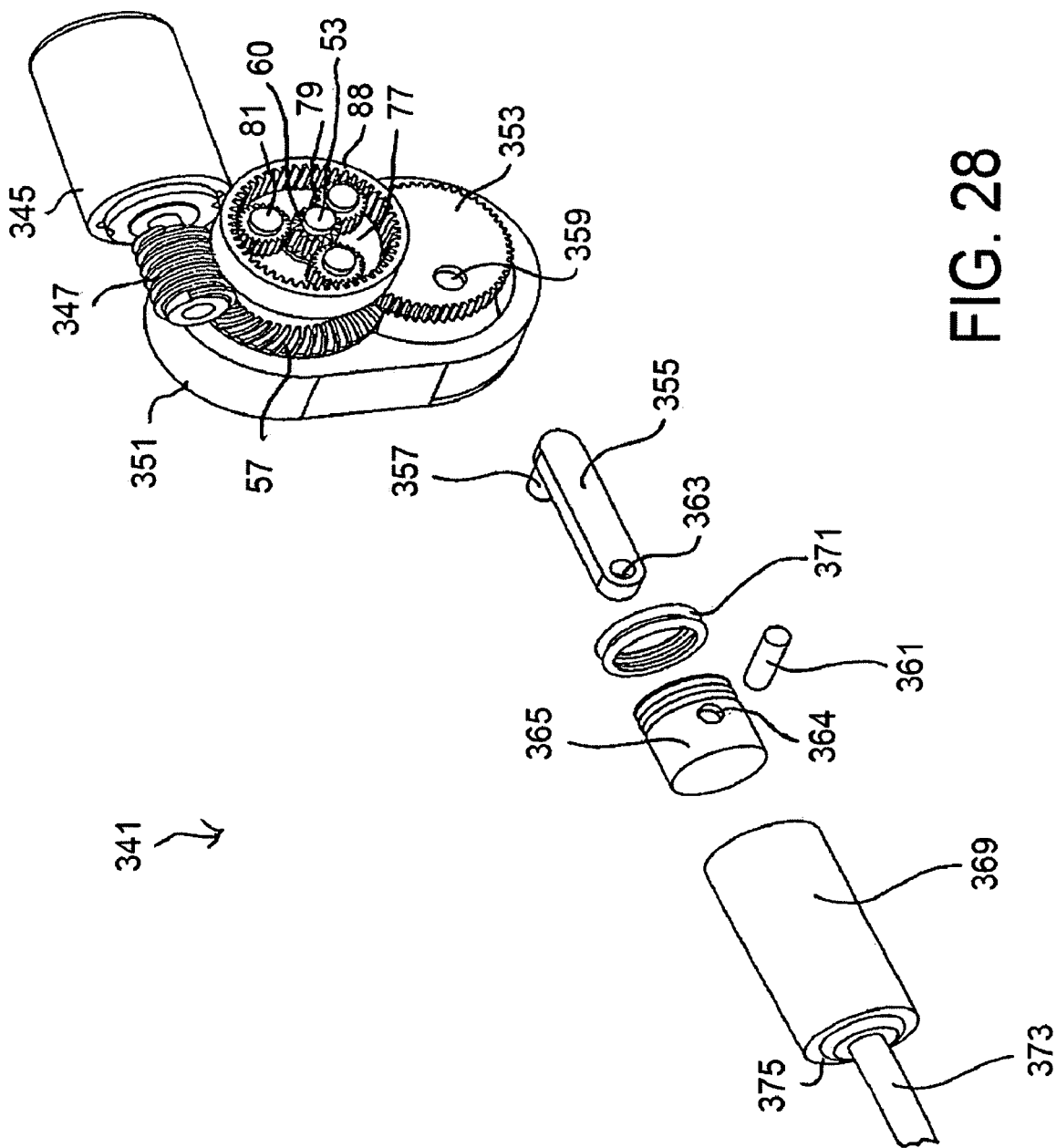
FIG. 28 is another partially exploded view of the apparatus of FIG. 25.
Figure 29:
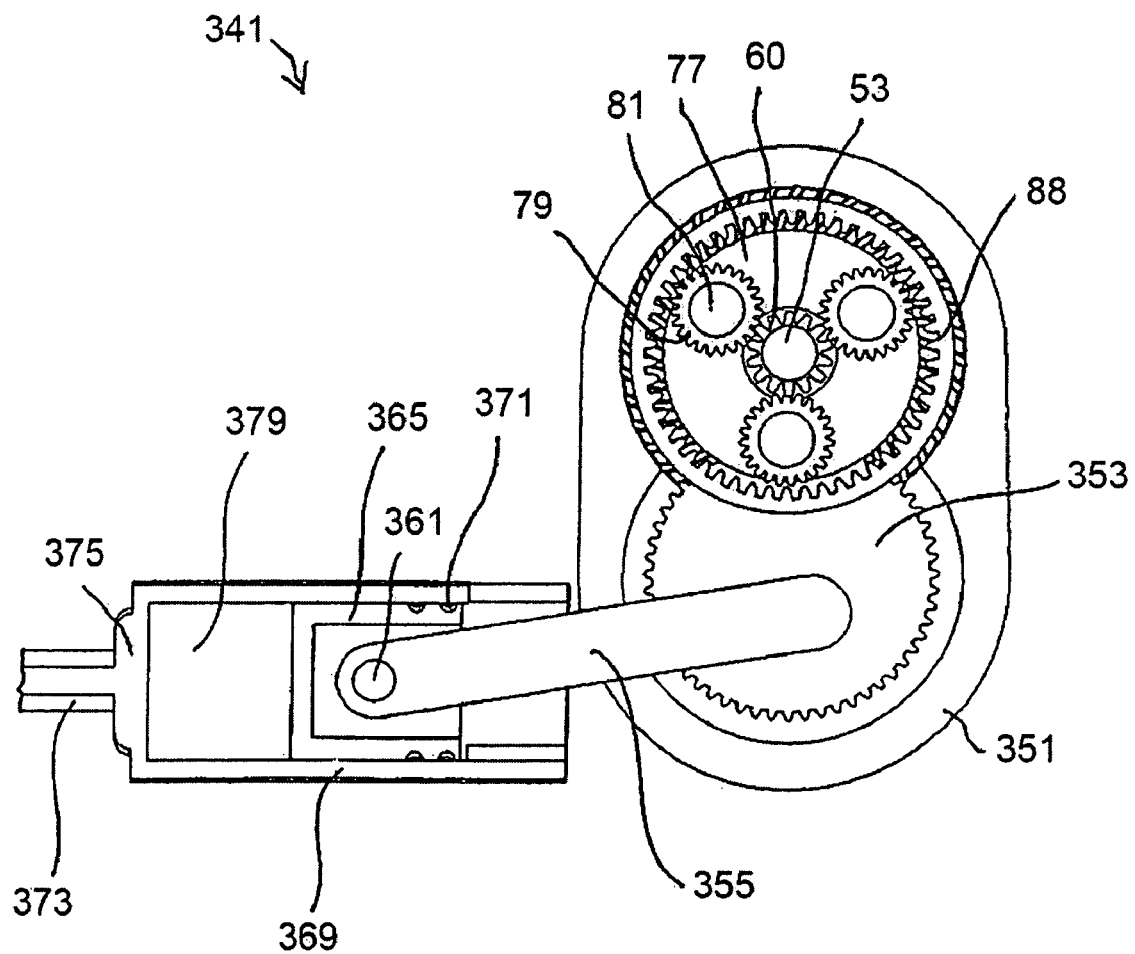
FIG. 29 is a partial sectional illustration of the apparatus of FIG. 25.
Figure 30:
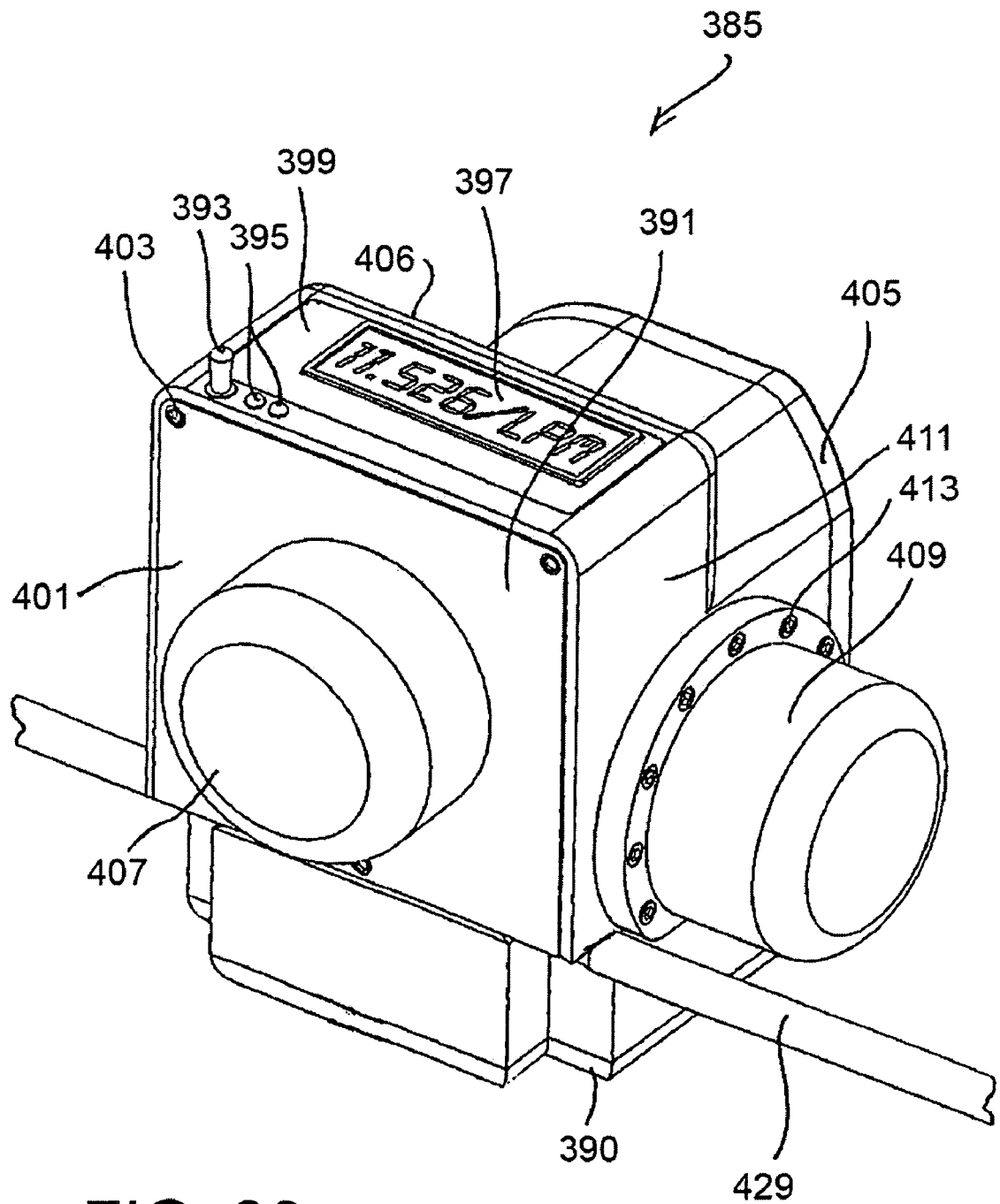
FIG. 30 is a perspective view of a fifth embodiment of apparatus of this invention (a peristaltic pump) utilizing the drive in accord with FIG. 1.
Figure 31:
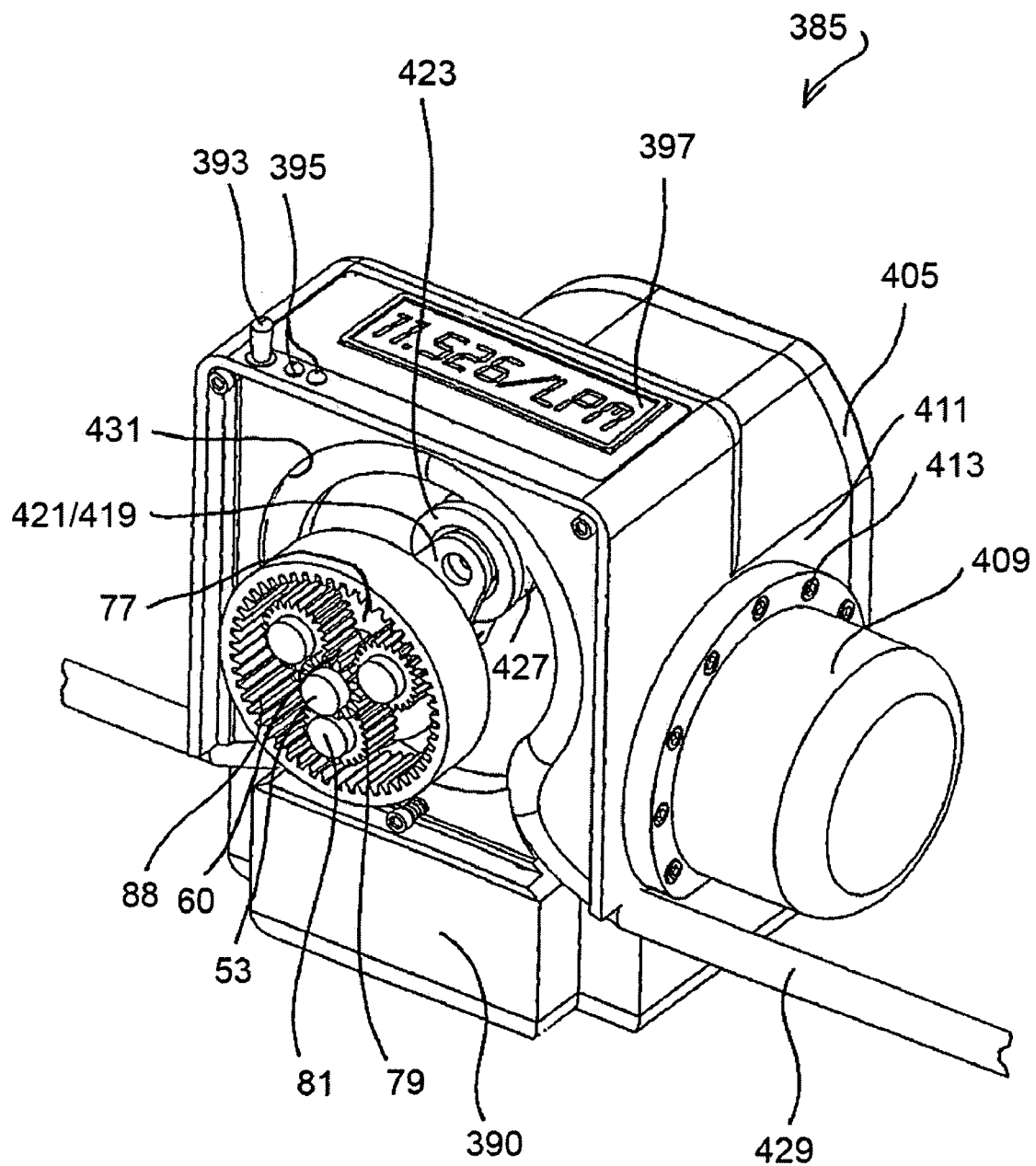
FIG. 31 is a partially exploded view of the apparatus of FIG. 30.

Worm gear drive shaft 323 is located on the back face of carriage 317 and is stabilized in mounting interface 333 utilizing known components (such as a bearing set). The same component can be used to provide a thrust bearing for worm gear 324 which is preferably captured on it distal end by a second combination bearing assembly. Worm gear 324 engages hypoid rotational source gear/wheel 57 as shown in FIG. 24 thus actuating drive 51 for cable take-up on cable drum 253.

Figure 20:
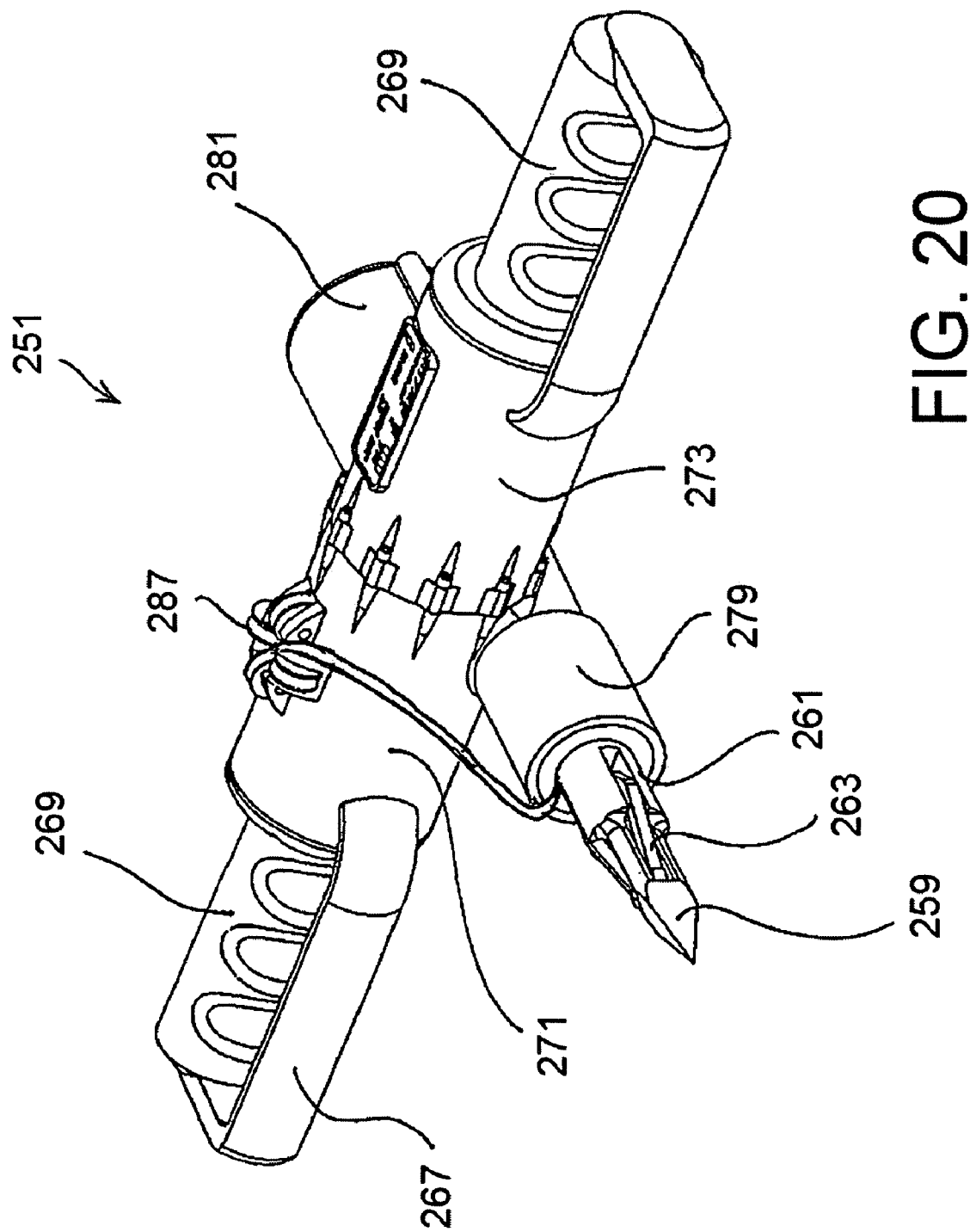
FIG. 20 is another perspective view of the apparatus of FIG. 15.

To launch grapple 259 utilizing pressurized gas (air) in cylinder 291, grapple body 261 is inserted into firing tube housing module 279 as shown in FIGS. 20 and 21. Grapple body 261 preferably includes o-rings mounted thereabout to cause a seal between the wall of cylinder 291 and body 261. Cylinder 291 is forced into tubular spike 325 providing passageway 326 into pressure chamber 327 having a tubular firing pin 328 slidably mounted therein and spring biased in the chamber by spring 329 bearing against pin shoulder 330. Pin 328 has a communication port 331 positioned for communication between pin passage 332 and pressure chamber 327. Electric solenoid 333 having solenoid rod 334 actuatable therein is positioned for displacement of pin 328 in chamber 327 upon actuation of the solenoid by a user actuation of one of the electrically coupled trigger switches 276. Displacement of pin 327 against spring bias eventually brings port 331 into position to receive high pressure gas therethrough and into passage 332 of pin 328 from chamber 327. The gas thus received flows into outlet tube 335 communicating with the rear of firing tube housing module 279 thereby discharging a high pressure gas charge into module 279 and launching grapple 259. Thereafter, spring 329 biases pin 328 rearward in chamber 327 thereby closing port 331.

A hydraulic piston pumping apparatus 341 is illustrated in FIGS. 25 through 29 having drive 51 integrated thereinto as shown. While no housing is illustrated, this is felt to be of no difficulty. Motor 345 has worm gear 347 connected at output shaft 348 thereof. Gear 347 is in driving engagement with right angle translate gear 57 (a hypoid wheel gear 349) held in an operable position by bearing 67 pressed into a housing support 351. The end of shaft 53 can be secured in an operative position by bearing 69 press fit in a housing cover as heretofore described. Rotation of hypoid wheel gear 57/349 provides input to drive 51. Transmittance 85 at outer shaft 71 is placed in drivable mesh with crank drive gear 353, causing crank gear 353 to rotate responsive to operation of drive 51.

Crank arm 355 is off-center attached to the face of drive gear 353 using crank pin 357 receivable at crank gear face opening 359. Crank pin 361 is receivable through crank arm end opening 363 and piston opening 364 after receipt of the end of crank arm 355 at the interior of piston 365. Piston 365 is slidably received in cylinder 369 and sealed therein by ring seals 371. Cylinder 369 has fluid outlet port 373 at end wall 375 thereof, and appropriate valved inlet porting as is known. Movement of piston 365 toward wall 375 of cylinder 369 forces fluid out from chamber 379 through port 373 while reverse movement draws fluid into the chamber through the inlet porting.

A compact portable peristaltic pumping apparatus 385 is illustrated in FIGS. 30 through 39. Drive 51 is integrated thereinto as shown, the pumping apparatus being particularly suitable for medical implementations such as transfer of blood in dialysis equipment. The use of drive 51 therein minimizes power consumption by reduction in friction in a high torque drive train. Pumping apparatus 385 may be ac coupled or powered by batteries 387 in battery pack 389 (FIG. 37) held at detachable bottom wall 390 of housing 391. On/off control and on-board programming is accessible via control 393 with status lights 395 provided. Read-out panel 397 is located at top housing wall panel 399, and front wall 401 is retained thereat by fasteners 403. Rear wall 405 is likewise retained at rear housing panel 406. Drive mounting cap 407 is integral with front wall 401 and motor mounting cap 409 is retained on housing side wall 411 by fasteners 413.

Figure 32:
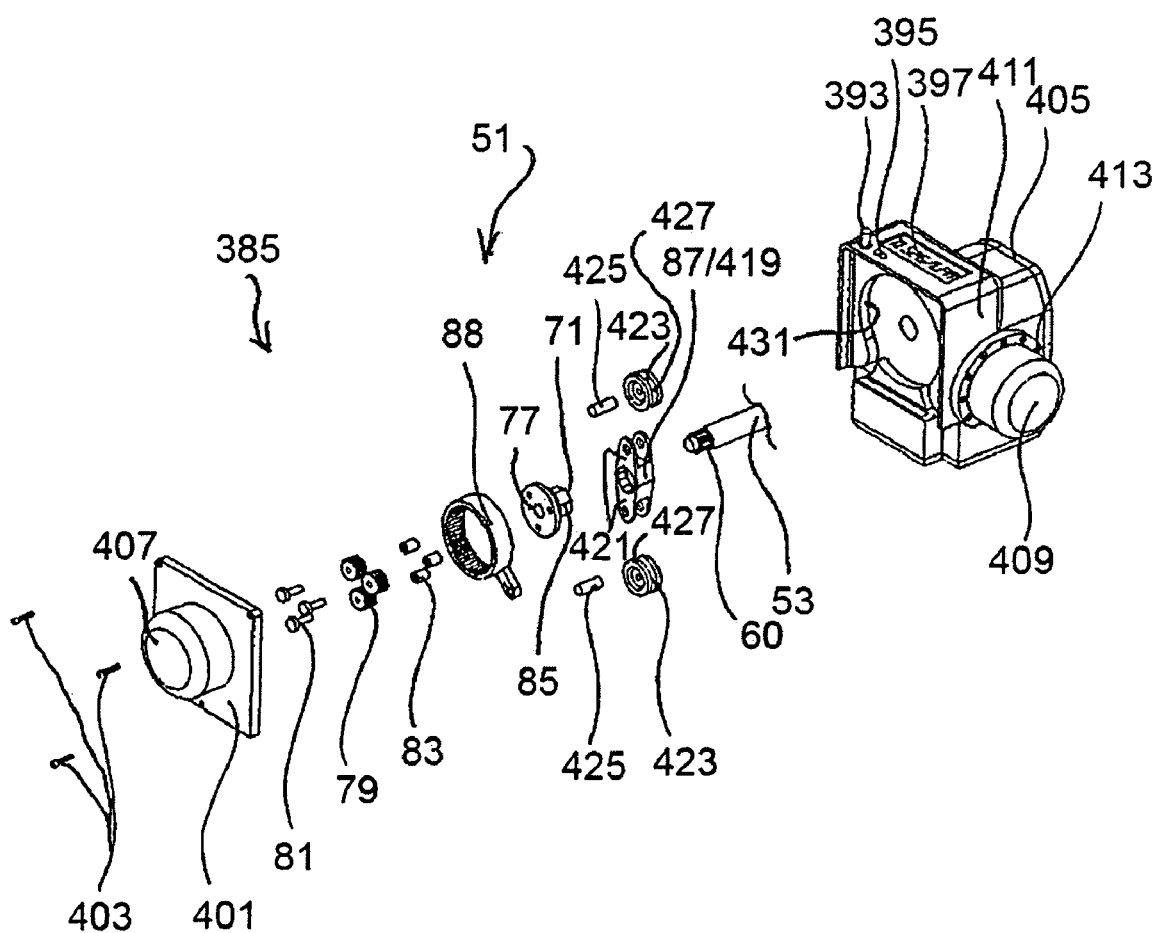
FIG. 32 is a further exploded view of the apparatus as shown in FIG. 31.

Drive 51 is illustrated in FIG. 32, with input/output 87 received on transmittance 85 (in this embodiment, a hex insert machined on the outer circumference of hollow shaft 71) being configured as a radial fluid transfer device 419. Device 419 includes diametrically opposed forks 421 each receiving a wheel 423 on pins 425. Wheels 423 have grooved outer circumferences 427 for riding against and pressing tube 429 against arcuate housing wall 431 to thereby press fluid forward in tube 429 with rotation of transfer device 419 in a highly controlled manner.

Figure 33:
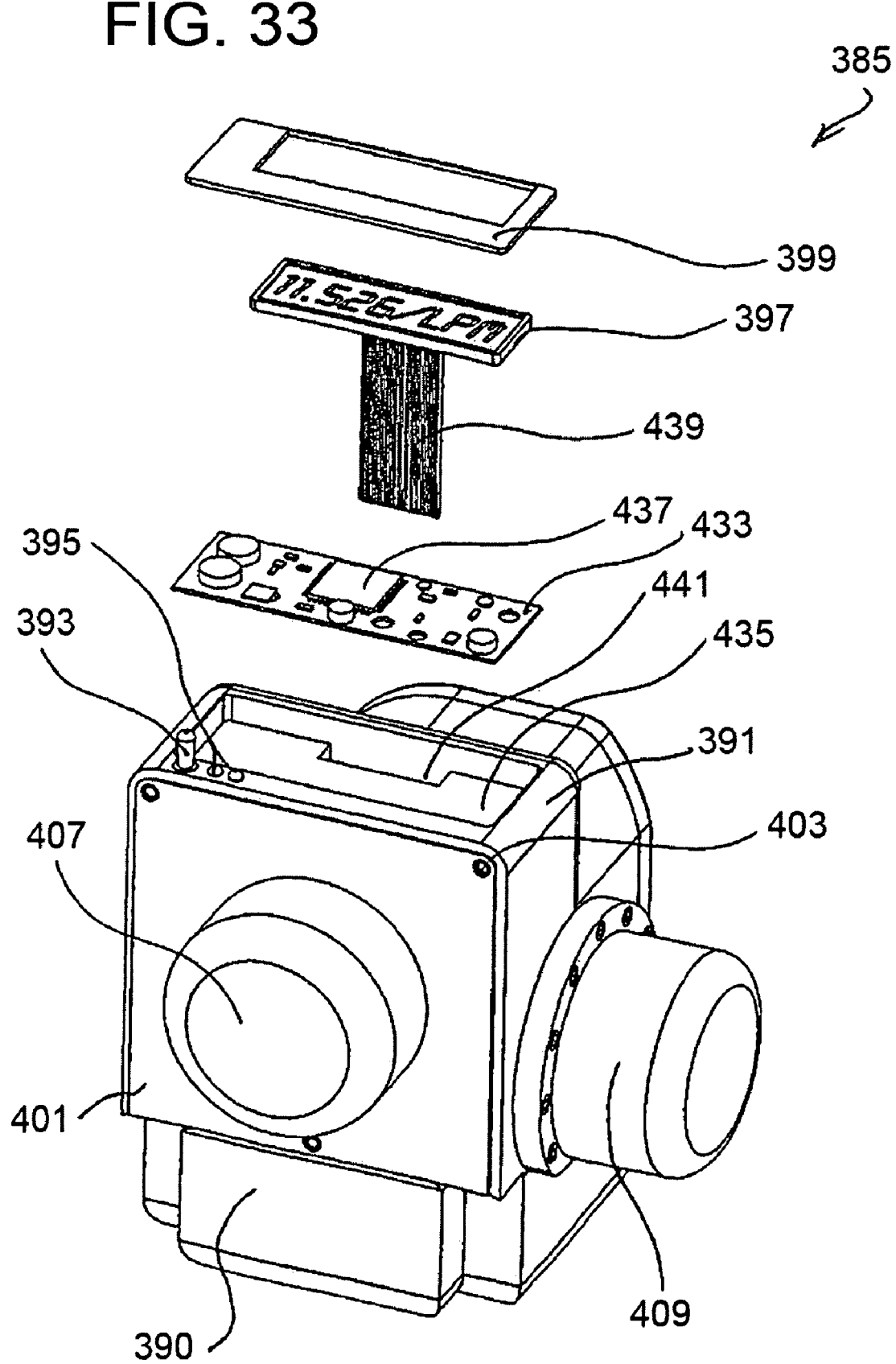
FIG. 33 is another partially exploded view of the apparatus of FIG. 30.
Figure 34:
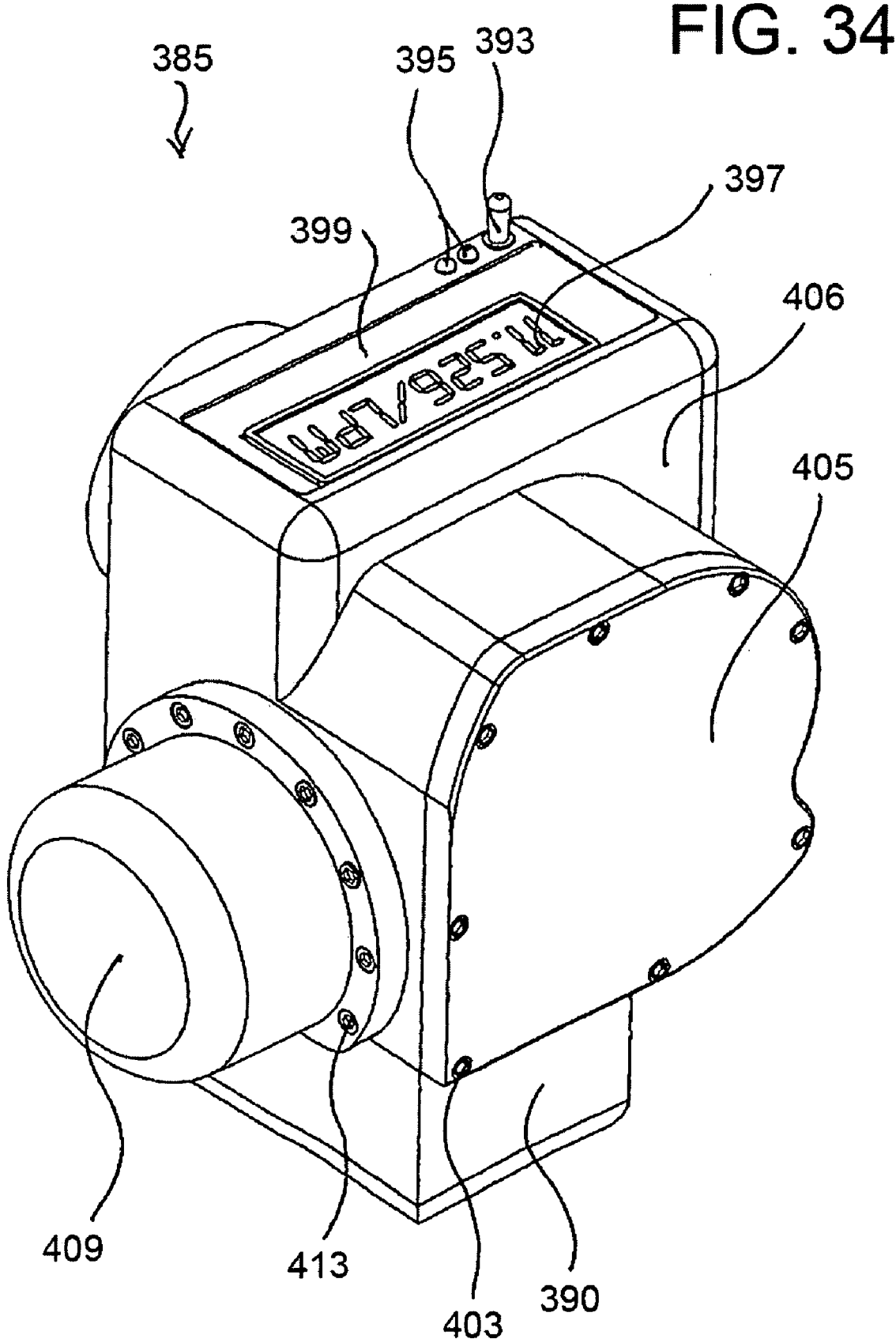
FIG. 34 is a perspective view of the apparatus FIG. 30.
Figure 35:
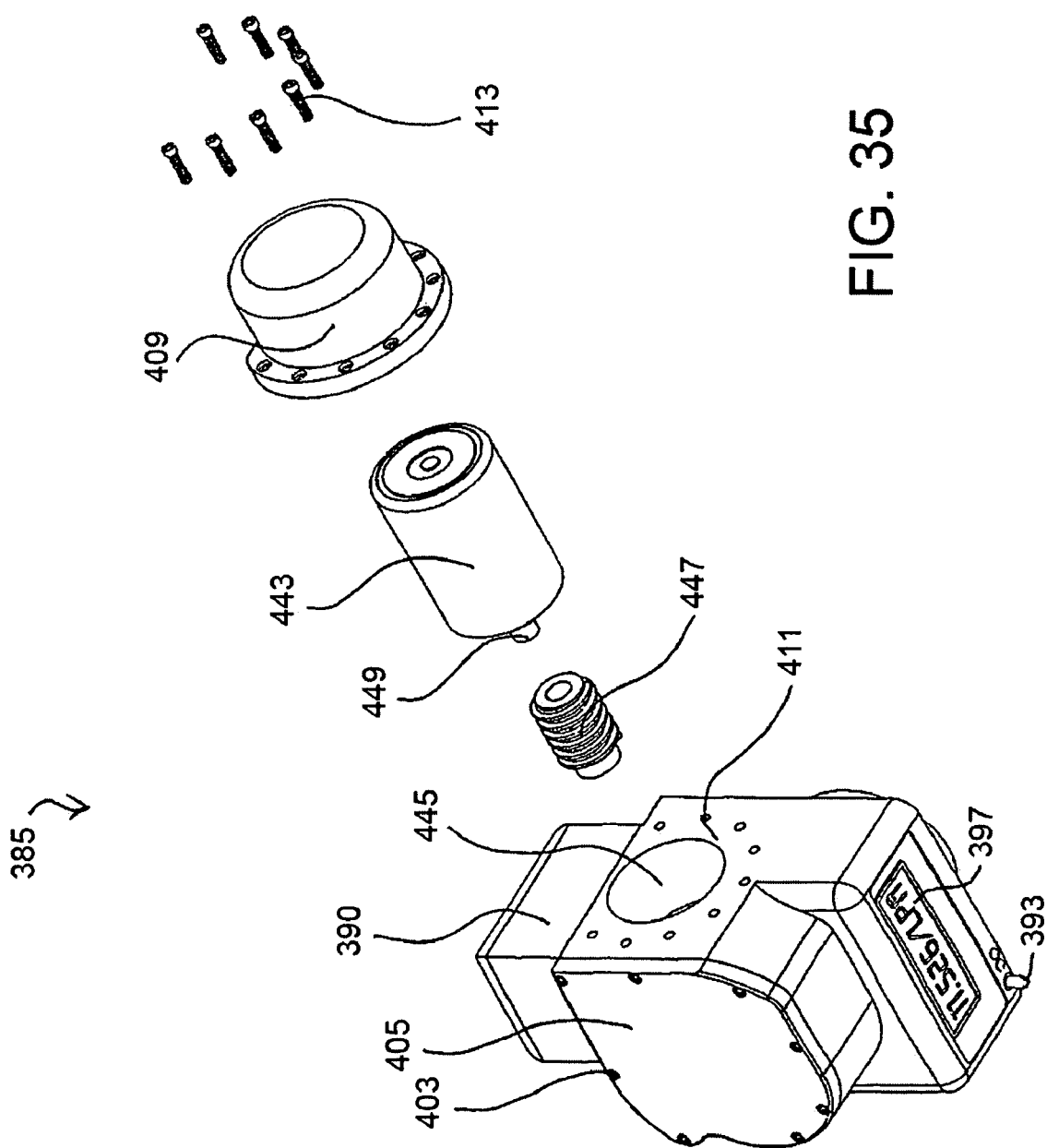
FIG. 35 is a partially exploded view of the apparatus of FIG. 30.
Figure 36:
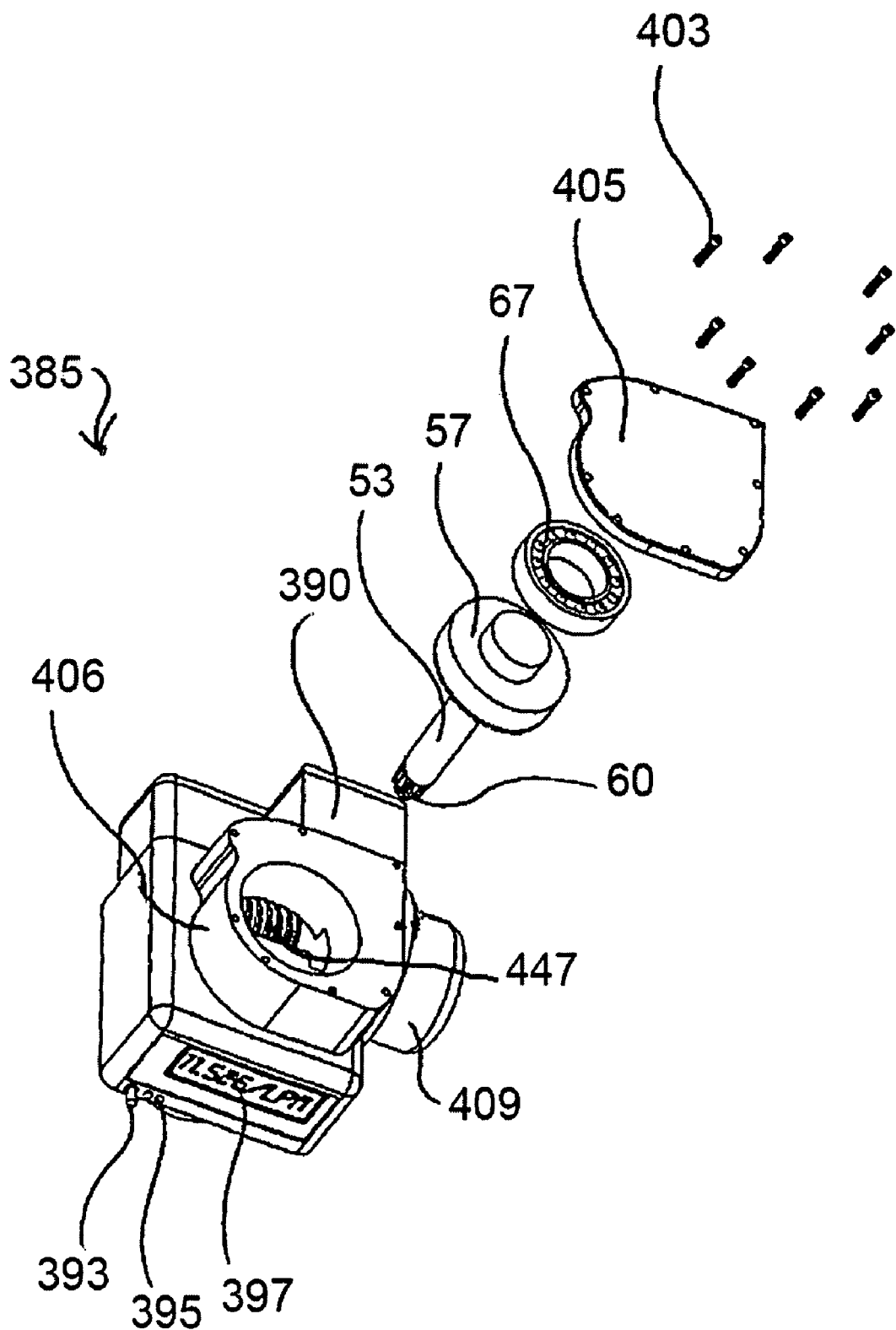
FIG. 36 is still another partially exploded view of the apparatus of FIG. 30.
Figure 37:
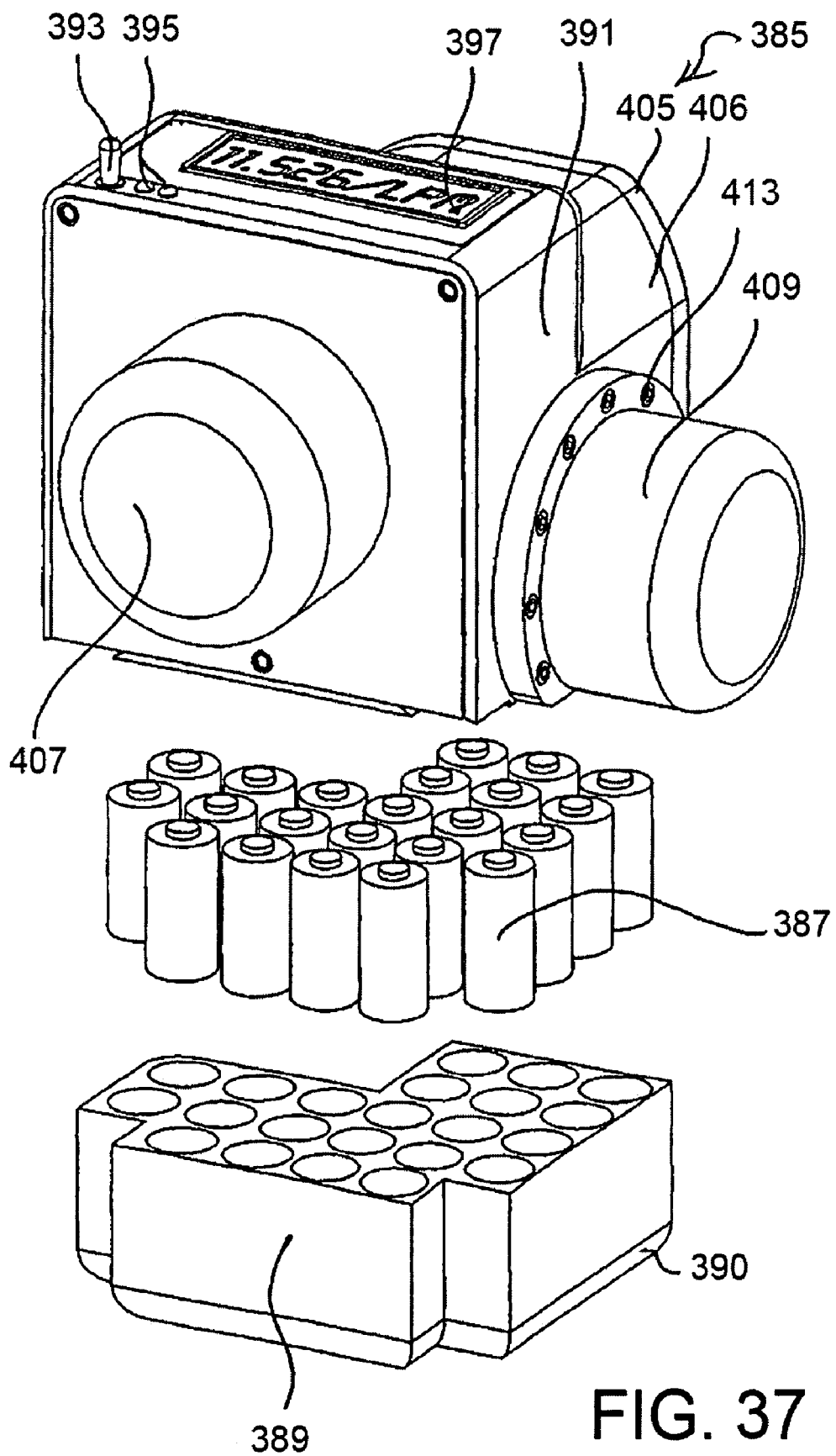
FIG. 37 is yet another partially exploded view of the apparatus of FIG. 30.
Figure 38:
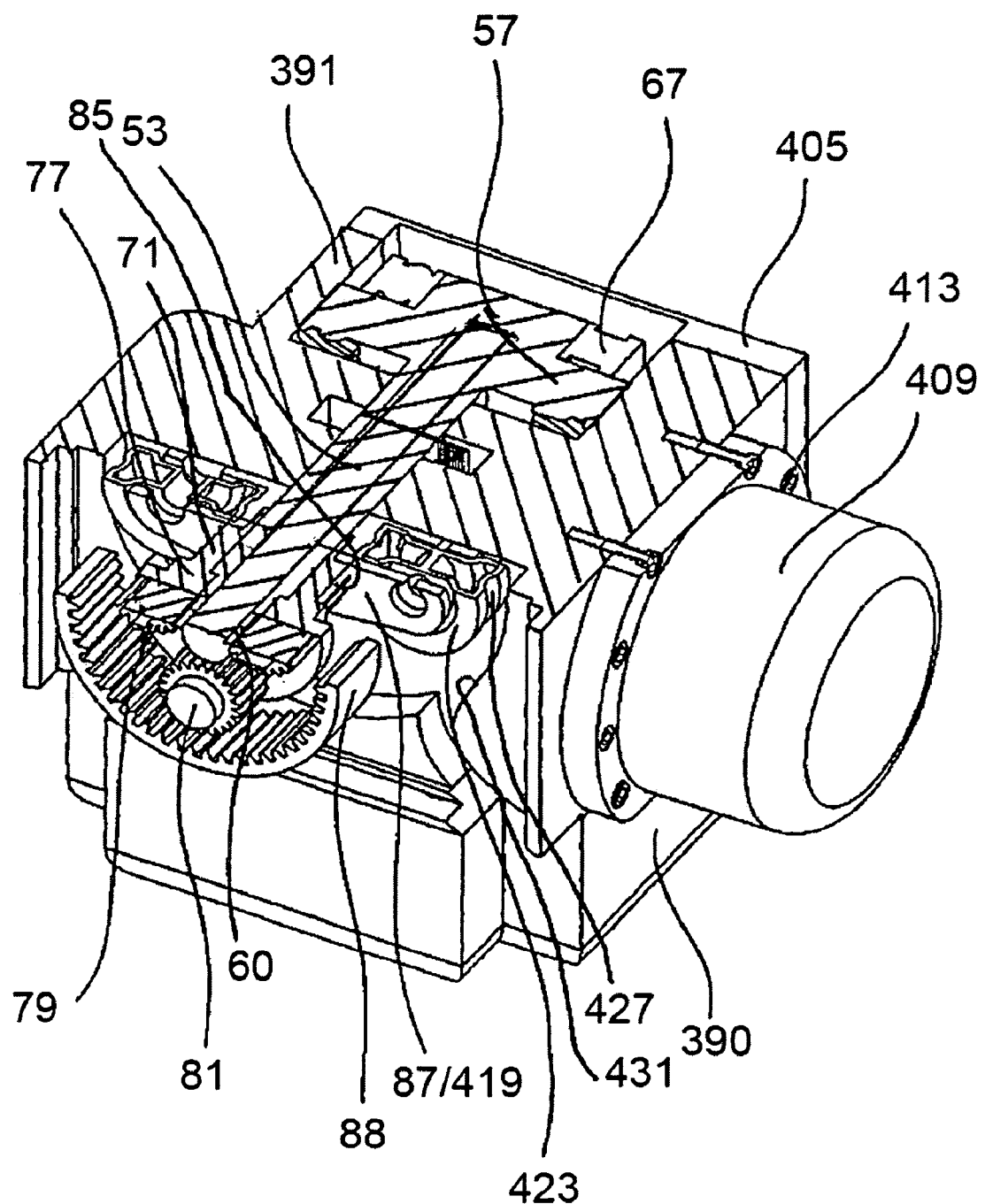
FIG. 38 is a sectional view of the apparatus of FIG. 30.
Figure 39:
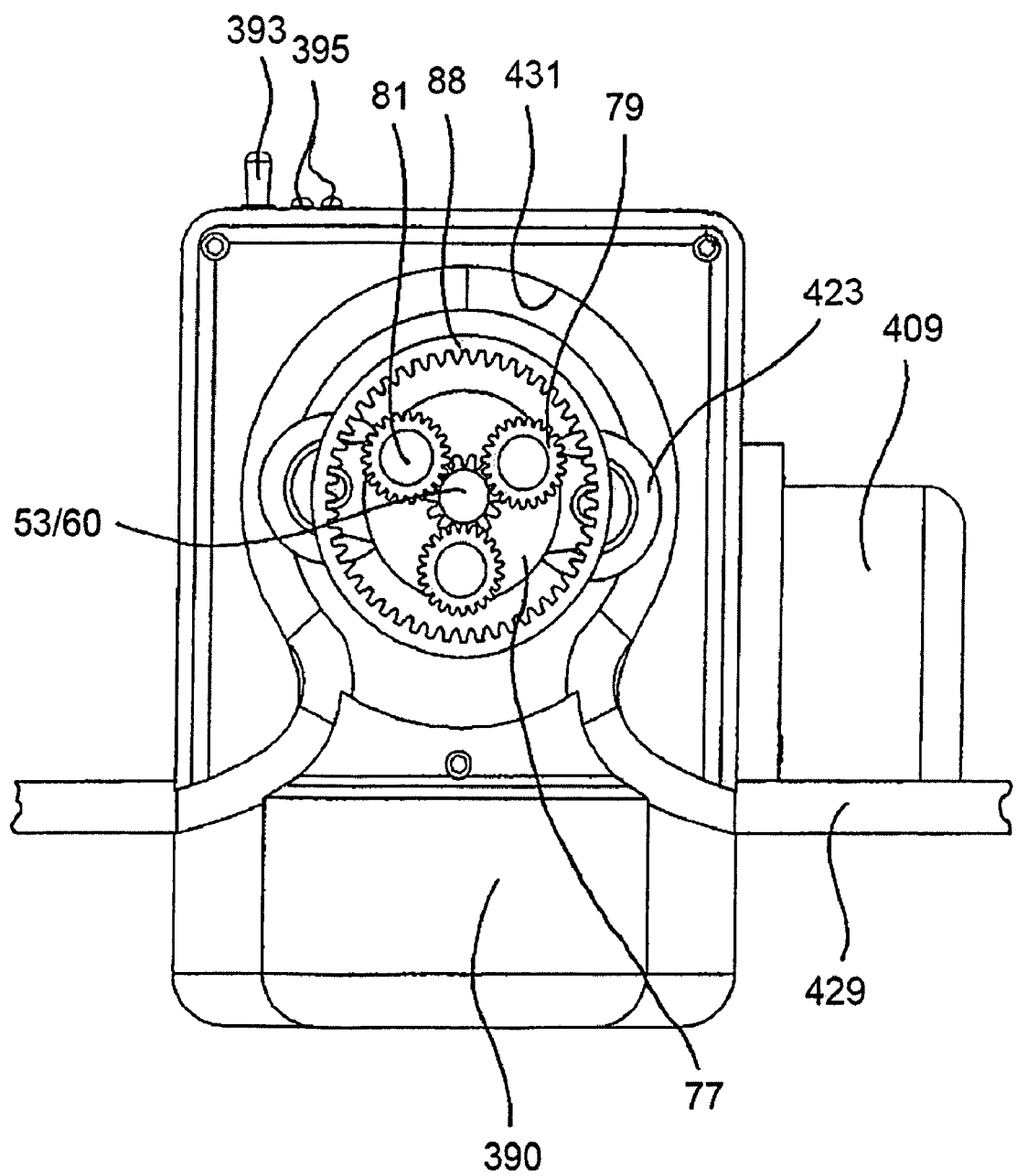
FIG. 39 is a side view illustration of the apparatus of FIG. 30.
Figure 40:
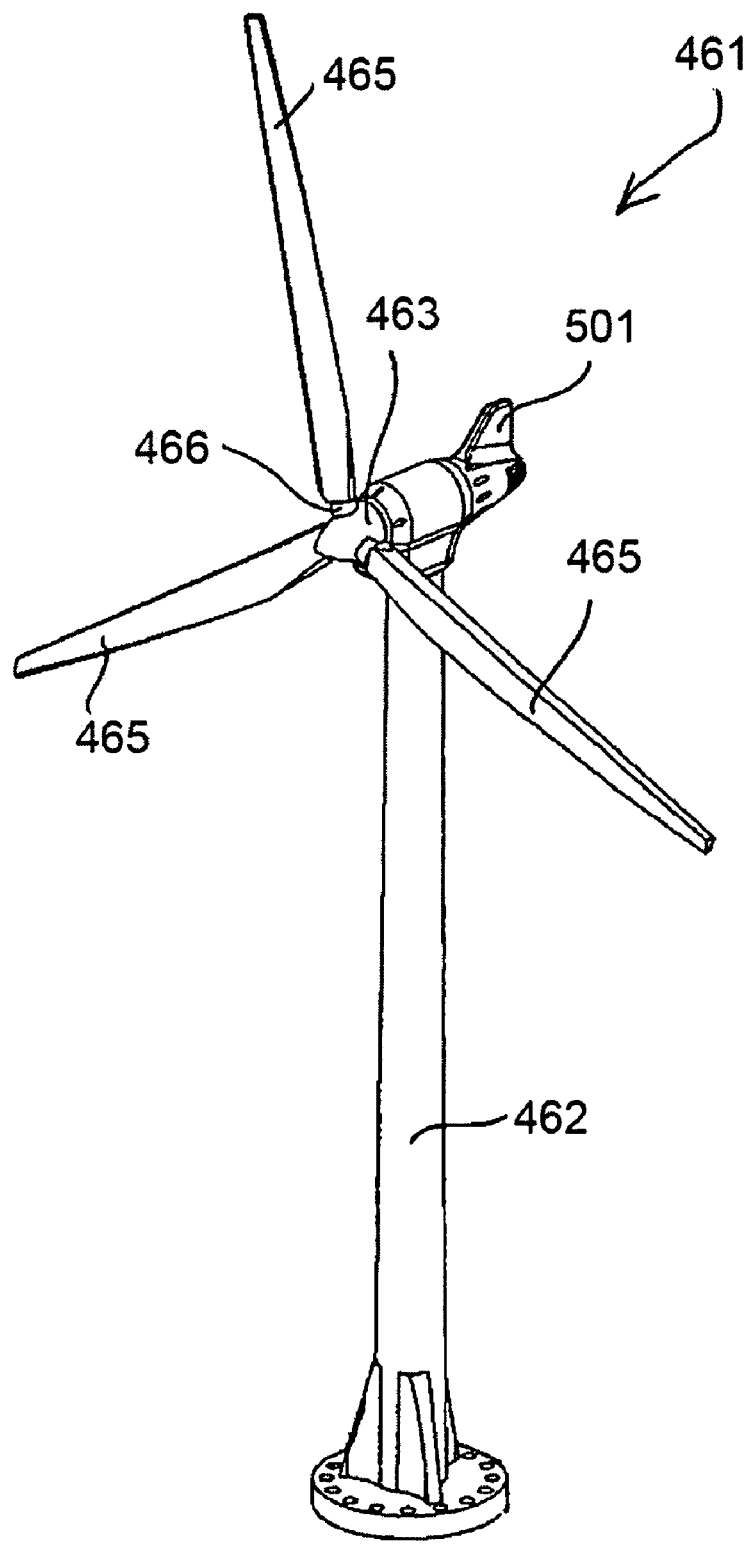
FIG. 40 is a perspective view of a sixth embodiment of apparatus of this invention (a wind mill) utilizing the drive in accord with FIG. 1 only in reverse input/output configuration.
Figure 41:
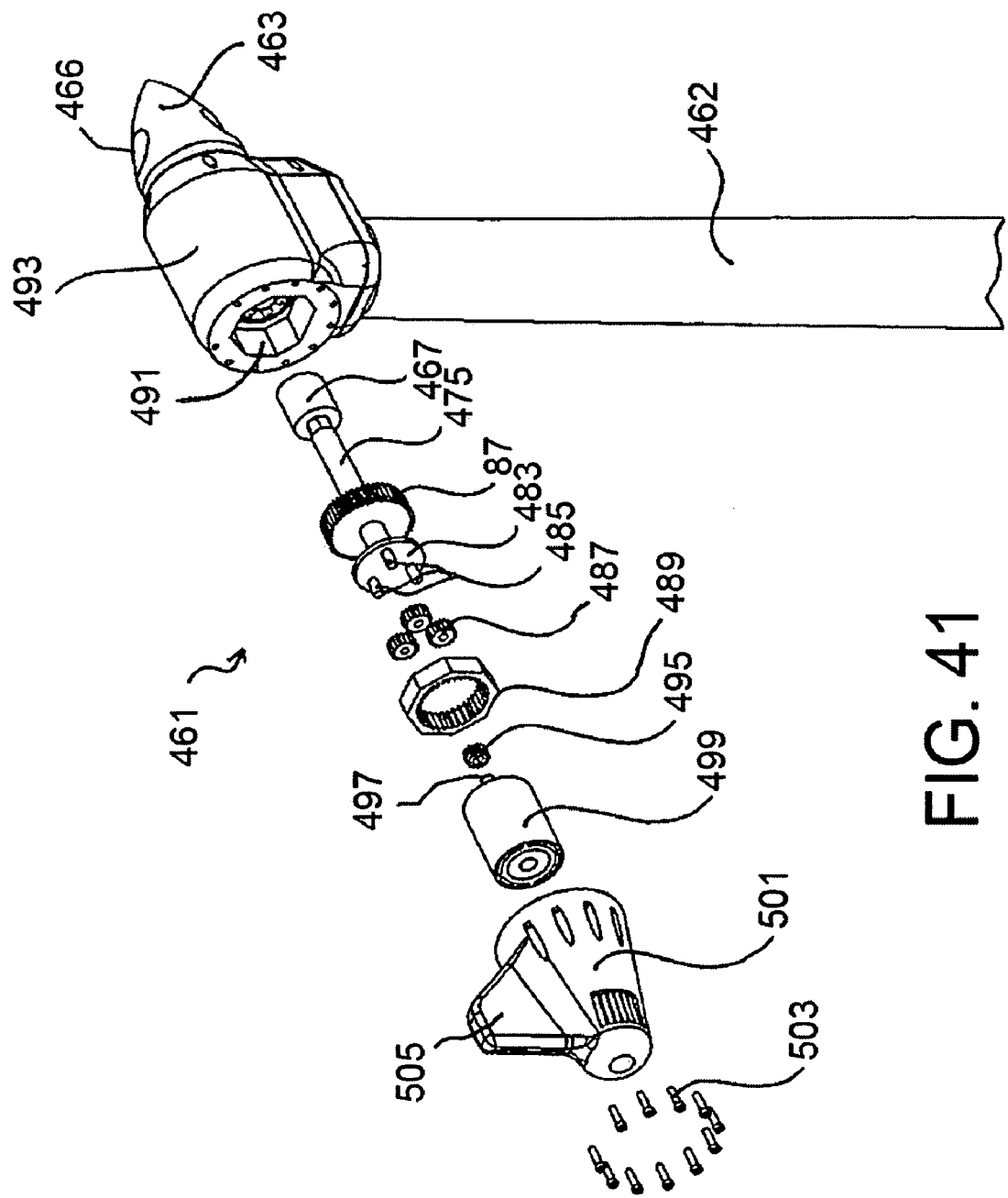
FIG. 41 is a partially exploded view of the apparatus of FIG. 40.
Figure 42:
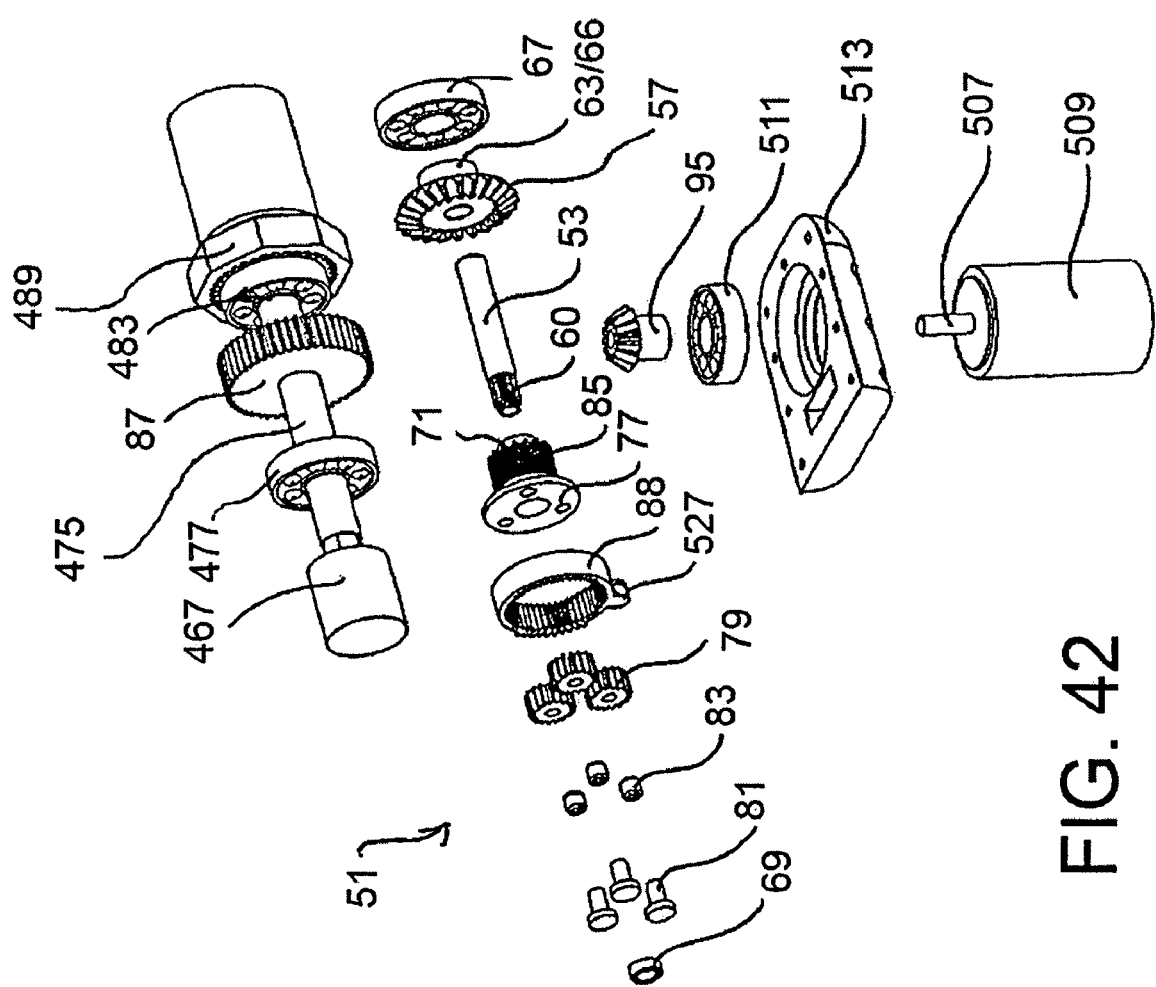
FIG. 42 is a partial exploded view of the apparatus of FIG. 40.
Figure 43:
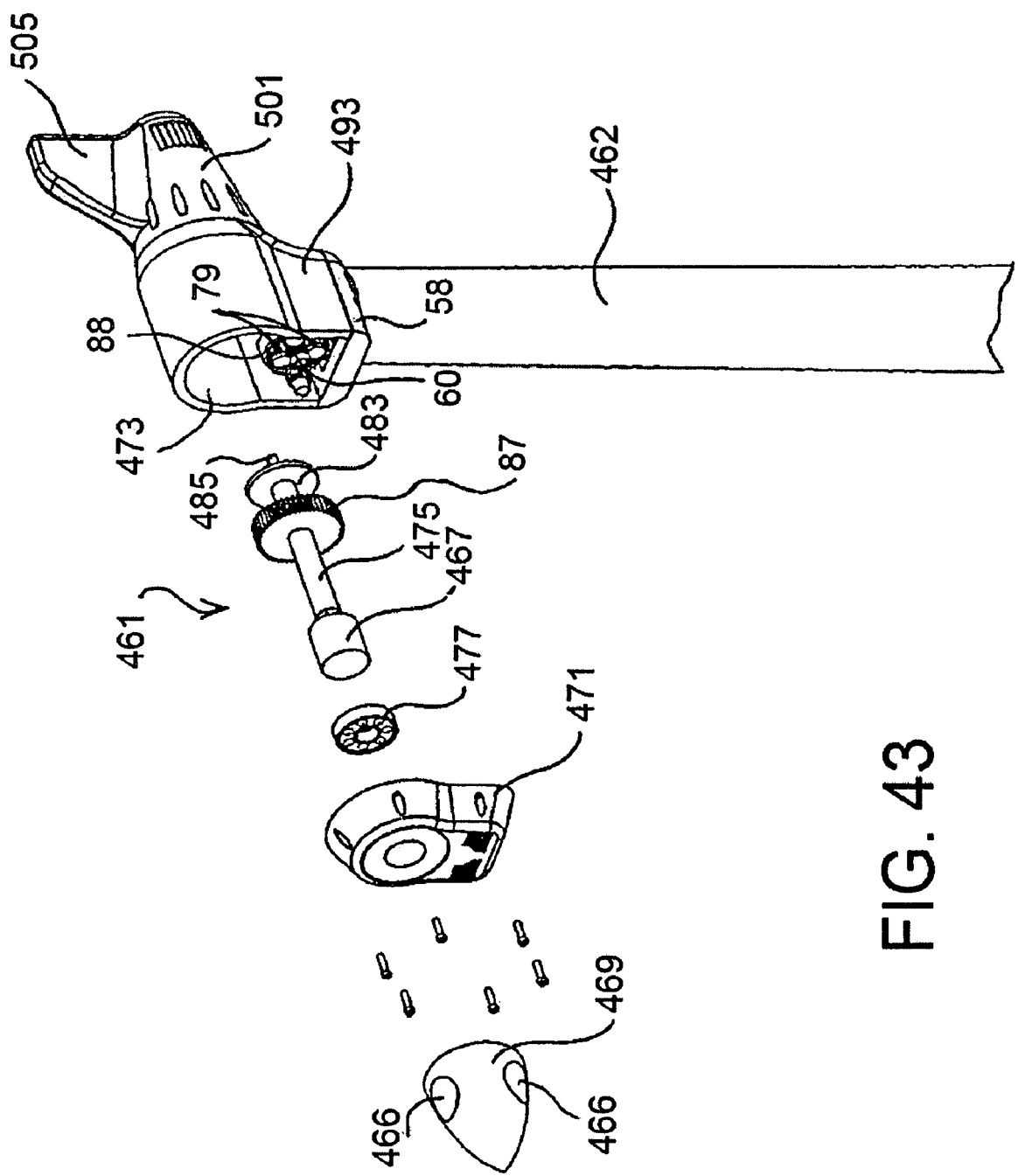
FIG. 43 is another partially exploded view of the apparatus of FIG. 40.
Figure 44:
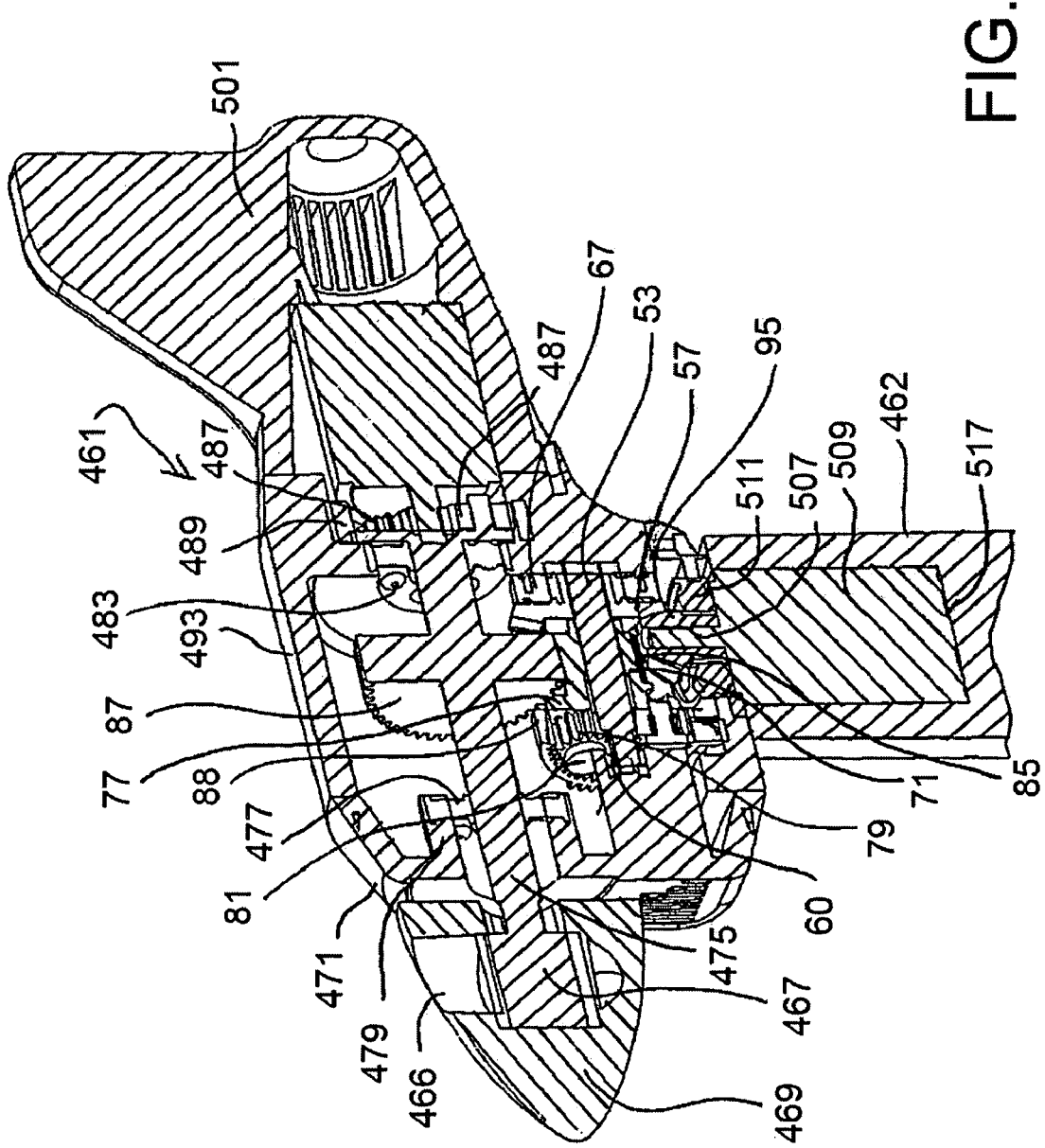
FIG. 44 is a sectional view of the apparatus of FIG. 40.

As shown in FIG. 33, motor control board 433 resides in mounting chamber 435 of housing 391 and includes microcontroller 437 thereon. Ribbon cable interface 439 from readout 397 is routed through housing 391 at passageway 441. Motor 443 located at both cap 409 and housing access opening 445 rotates worm gear 447 mounted on its output shaft 449. Gear 447 engages and rotates hypoid gear wheel 57 at the end of inner shaft 53 of drive 51 in turn rotating device 419 to move fluid. Movement of forks 421 is monitored by on board sensors and processing, and displacement of forks 421 during an operation of the pump can be used to monitor and determine of the viscosity of the fluid as it is moved through flexible tubing 429. While not shown, as fluid gets more difficult to move through tubing 429, ring 88 reacts by rotating, even if slightly, against bias of a spring of known spring rate mounted in cap 407. Position sensors or strain gauges sense this movement and signal on-board processing with a value indicative of degree of movement of ring 88. This value is used to determine density of the fluid. Fluid can then be thinned or density increased in response.

A wind powered single propeller electrical power generating apparatus 461 having twin generators is illustrated in FIGS. 40 through 47. Drive 51 is integrated thereinto as shown with reverse drive throughflow for use as an output shaft rotational speed increaser. A mechanical method is described for arranging two electrical generators used for simultaneous development of electrical power in a wind mill. One generator is well suited for generation of electrical power from a low to moderate air flow, at the same time a second generator is utilized for producing power from a more aggressive air flow. Both generators may be employed at the same time or operated independently by simply eliminating load to one of the generators (by simple switching, for example). The system is responsive to torque loads created by strong winds and includes automatic pitch adjustment to the propeller blades to optimize propeller speed for increasing efficiency.

Apparatus 461 is rotatably located on tower 462, its directional orientation determined by air flow direction. Tower 462 is durably located at a tower site using appropriate means. A conventional speed increaser is deployed in nose cone assembly 463 of apparatus 461. Angle of attack of a set of propeller blades 465 mounted in nose cone openings 466 to produce lift by dynamic interaction of an air flow over and around their curved surfaces is adjusted to a high angle of attack with the oncoming air flow through a propeller adjusting prop governor 467 (FIGS. 43 through 45) within nose cone assembly 463 including nose cone 469, nose enclosure plate 471 and forward enclosure compartment 473.

Propellers 465 and nose cone 469 are joined for driving rotation of propeller shaft 475 which extends through nose enclosure plate 471 on bearing 477 mounted in hub 479 of plate 471. Rotation of shaft 475 supplies rotary torque to drive gear 87 and planetary carriage 483 which is fitted with a set of drive axels 485 (preferably three, though greater numbers could be utilized). Axels 485 rotatably hold a set of planet gears 487 (preferably mounted on needle bearings as a set) orbitally guided in ring gear 489 pressed into rearward enclosure compartment 491 of main housing 493. Sun gear 495 is mounted on generator shaft 497 of generator 499 mounted in tail assembly 501 mounted to main housing 493 with screws 503. Tail assembly 501 includes vertical stabilizer 505 thereat.

Simultaneously, drive gear 87 is located in drivable mesh with transmittance (spur gear) 85 at outer shaft 71 of drive 51. Rotation of the engaged transmittance 85 causes rotation of planet gears 79 in ring gear 88 thereby imparting torsional input to sun gear 60 at the end of inner shaft 53 creating a shaft rotational speed increaser (24 to 1 in this case). Right angle translate bevel gear 57 is meshed with bevel pinion output gear 95 mounted on shaft 507 of generator 509 and rotatably stabilized on bearing set 511 pressed into housing mount base plate 513. Motor 509 is housed in tower compartment 517 of tower 462. This arrangement provides increased rpm input to generator shaft 507 and generator 509.

Figure 10:
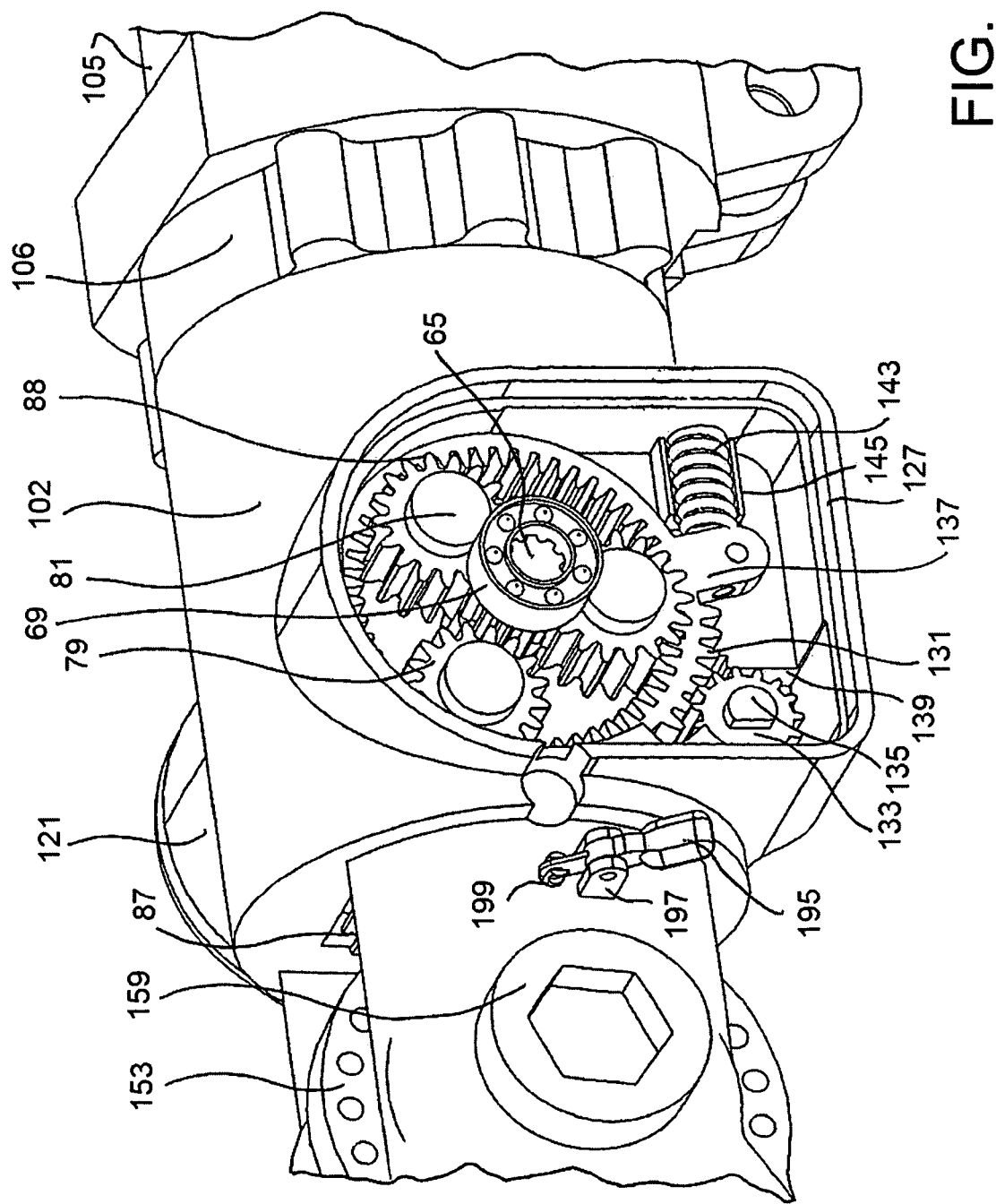
FIG. 10 is a detailed partial perspective view of the apparatus of FIG. 5.
Figure 11:
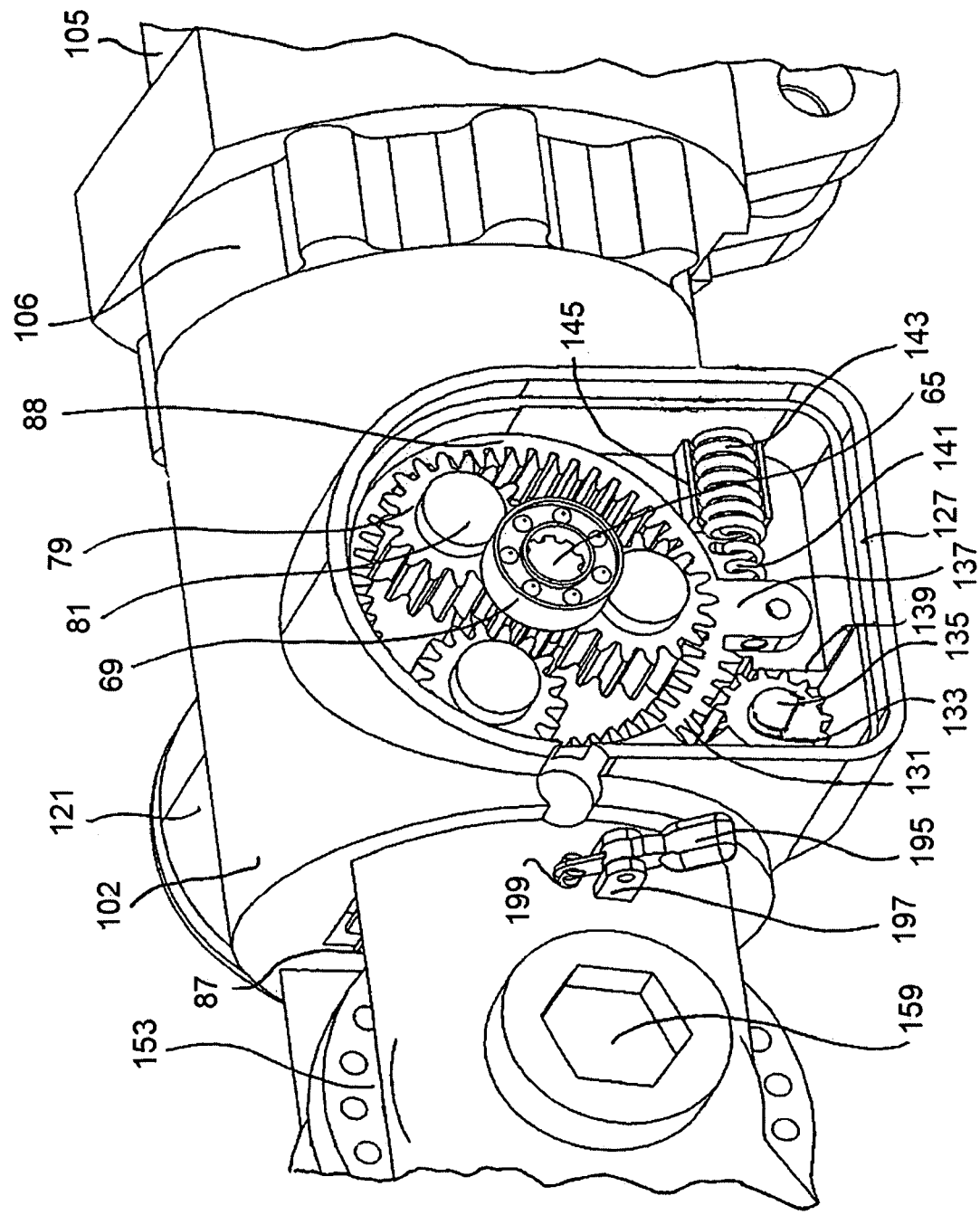
FIG. 11 is another detailed partial perspective view of the apparatus of FIG. 5.
Figure 45:
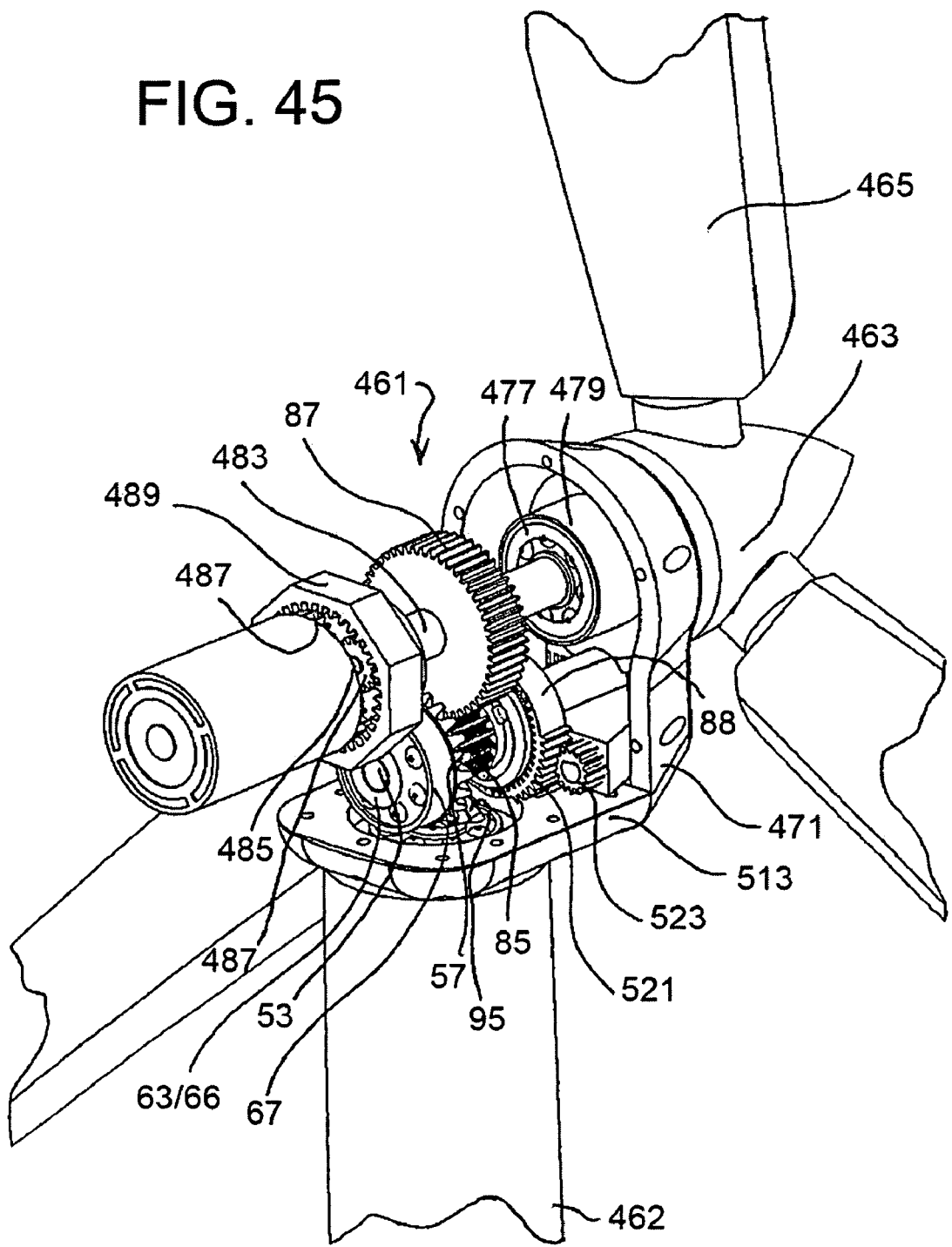
FIG. 45 is a partial perspective view of the running components of the apparatus of FIG. 40.
Figure 46:
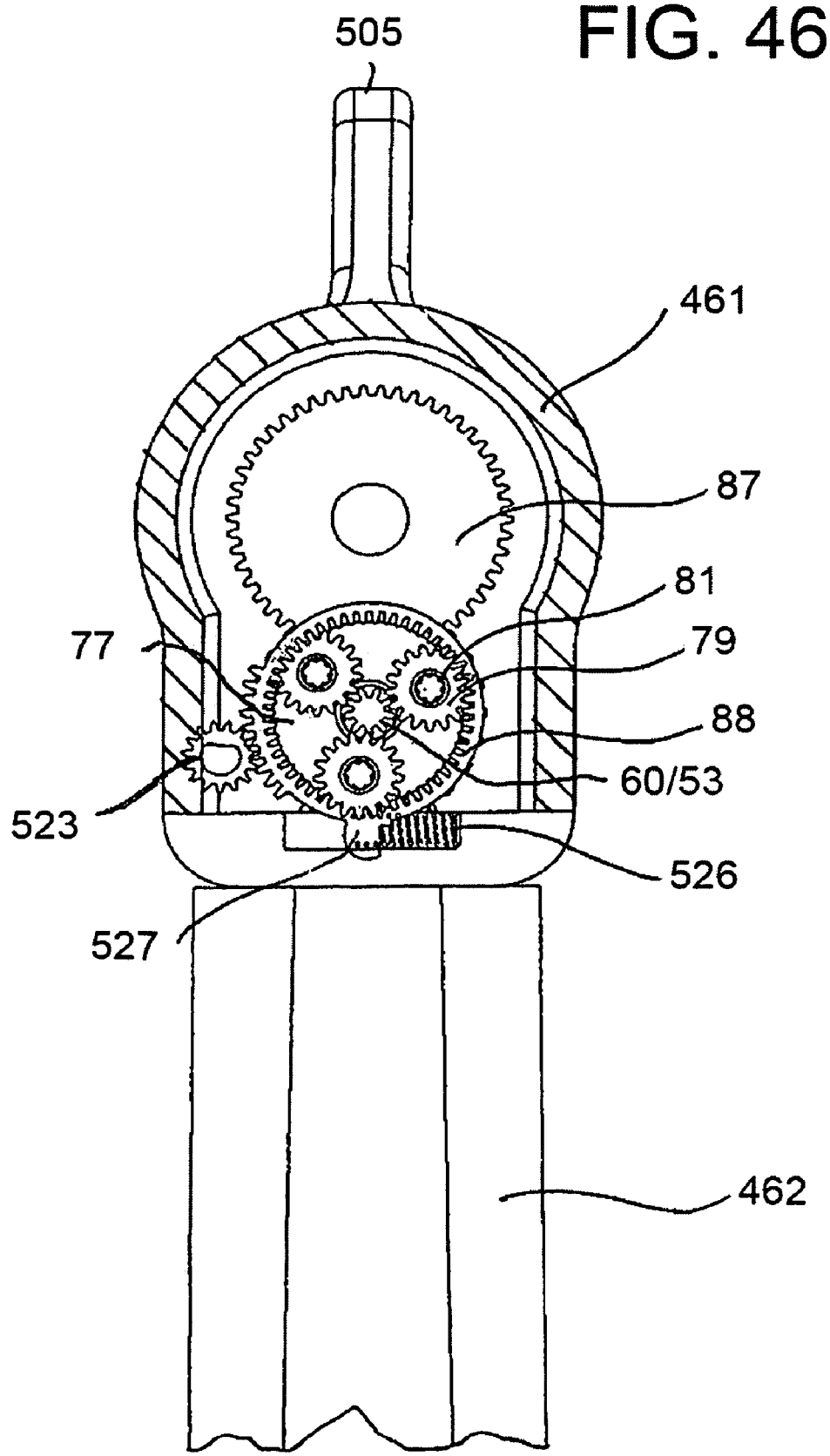
FIG. 46 is an end view sectional illustration of the apparatus of FIG. 40.
Figure 47:
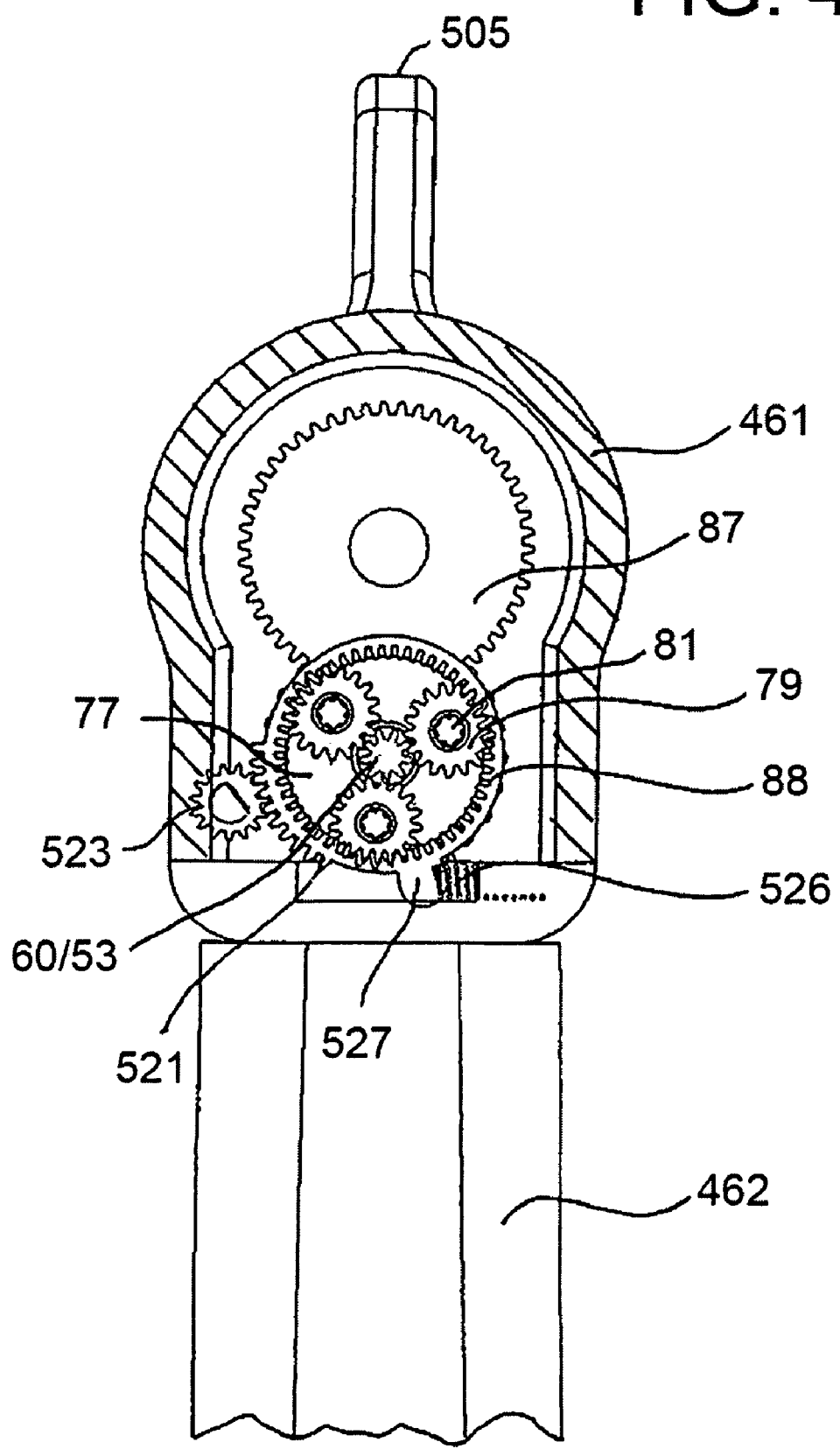
FIG. 47 is another end view sectional illustration of the apparatus of FIG. 40.

As best shown in FIGS. 45 through 47, ring gear 88 has sector gear 521 thereat which is engaged by spur gear 523. Spur gear 523 can be connected to any number of different sensing devices depending on desired monitoring capability, some of which have been suggested hereinabove, but is preferably linked to an optical encoder which detects changes of azimuthal position of ring gear 88 based on spur gear rotation. In such case, ring gear 99 is held against rotation by a compression spring 526 of known rate connected between torque reaction arm 527 at ring gear 88 and a housing structure or the like (as shown in FIG. 10 for example). Torque responsive rotation of ring gear 88 is then measured by resulting compression of spring 526 to thus indicate torque imposed on drive 51 (Hooks Law). In direct response thereto, torque load on the system can be regulated by active dynamic adjustments in propeller blade angle via governor 467 actuated as described above.

As may be appreciated from the foregoing, various apparatus utilizing the drive of this invention are greatly improved. The drive of this invention is compact and cost effective and its use effectively reduces cost of upstream and/or downstream components in drive trains while obtaining results equal to more expensive and less reliable assemblies.

What is claimed is:

1. An epicyclic drive comprising:
    an inner shaft having an engageable end and a sun gear located on an opposite end;
    a coaxial hollow outer shaft having an engageable transmittance at an external surface thereof intermediate first and second opposite ends thereof, a planetary gear set platform affixed to said second end thereof with planet gears rotatably mounted thereabout, said inner shaft extending through said hollow outer shaft and rotatable therein with said sun gear extending through said platform into engagement with said planet gears and said engageable end extending from said first end and away from said second end; and
    a stationary ring gear engaging said planet gears therein to facilitate rotation of said outer shaft responsive to rotation of said planet gears by said sun gear of said inner shaft.

2. The drive on claim 1 further comprising first and second bearing surface supports receiving and supporting said engageble end and said opposite end, respectively, of said inner shaft.

3. The drive of claim 1 further comprising a right angle translate gear affixed to said inner shaft adjacent to said engageable end.

4. The drive of claim 1 wherein said transmittance includes a drive gear, whereby said drive gear is thereby located toward the center of said drive.

5. The drive of claim 1 wherein said outer shaft is substantially primarily supported by said inner shaft.

6. The drive of claim 1 wherein one of said engageable end and said transmittance includes means for engagement with a source of rotational input and the other of said engageable end and said transmittance includes means for engagement with a utility output.

7. The drive of claim 1 wherein planetary gear set platform includes axle assemblies for rotationally receiving said planet gears thereon.

8. An epicyclic translative drive comprising:
    an inner shaft having a right angle translate gear affixed to an engageable end thereof and a sun gear located on an opposite end; and
    a coaxial hollow outer shaft having an engageable transmittance intermediate first and second opposite ends thereof, a planetary platform at said second end thereof, said inner shaft extending rotatably through said hollow outer shaft with said sun gear extending through said platform and said engageable end extending from said first end.

9. The drive of claim 8 further comprising planet gears rotatably mounted about said platform and a stationary ring gear engaging said planet gears to facilitate rotation of said outer shaft responsive to rotation of said planet gears by said sun gear of said inner shaft said engageable transmittance located between said right angle translate gear and said sun gear.

10. The drive of claim 8 wherein said translate gear is one of a bevel gear, worm gear or hypoid gear.

11. The drive of claim 10 wherein said transmittance is a spur gear.

12. The drive of claim 10 further comprising a rotatable element including one of a worm gear and a pinion gear engagable with said translate gear.

13. The drive of claim 12 further comprising an electric motor rotatably coupled with said rotatable element.

14. The drive of claim 8 further comprising mounting means having first and second bearing surface supports maintained thereat for receiving and supporting said engageble end and said opposite end, respectively, of said inner shaft.

15. A utility apparatus comprising:
    an epicyclic translative drive including an inner shaft having a sun gear located on one end, a coaxial hollow outer shaft having an engageable transmittance intermediate first and second opposite ends thereof, a planetary gear set platform at said second end thereof with planet gears rotatably mounted thereabout, said inner shaft extending rotatably through said hollow outer shaft with said sun gear extending through said platform into engagement with said planet gears, and a right angle translate gear affixed to said inner shaft at an end opposite said sun gear;

a rotational source directly engaged at one of said right angle translate gear and said transmittance; and a utility output directly engageable at the other of said right angle translate gear and said transmittance.

16. The utility apparatus of claim 15 further comprising a housing, a stationary ring gear engaging said planet gears mounted in said housing.

17. The utility apparatus of claim 15 wherein said rotational source is an electric motor.

18. The utility apparatus of claim 15 wherein said utility output is at said right angle translate gear thereby providing rotational rate increase.

19. The utility apparatus of claim 15 wherein said utility output is at said transmittance thereby providing torque multiplication.

20. The utility apparatus of claim 15 wherein said utility output is any one of a generator, a crank assembly, a radial fluid transfer assembly, a socket driver, and a cable drum.

* * * * *